(12) United States Patent
Sampath

(10) Patent No.: US 8,599,945 B2
(45) Date of Patent: Dec. 3, 2013

(54) ROBUST RANK PREDICTION FOR A MIMO SYSTEM

(75) Inventor: Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1766 days.

(21) Appl. No.: 11/449,893

(22) Filed: Jun. 9, 2006

(65) Prior Publication Data

US 2007/0005749 A1    Jan. 4, 2007

Related U.S. Application Data

(60) Provisional application No. 60/691,723, filed on Jun. 16, 2005.

(51) Int. Cl.
*H04B 7/02* (2006.01)
*H04L 1/02* (2006.01)

(52) U.S. Cl.
USPC ........... 375/267; 375/260; 375/299; 375/346; 455/500; 455/501; 455/101

(58) Field of Classification Search
USPC ................. 375/260, 267, 299, 346, 347, 349; 455/500, 501, 101; 370/334, 338, 349, 370/436
See application file for complete search history.

(56) References Cited

U.S. PATENT DOCUMENTS

| 4,393,276 A | 7/1983 | Steele |
| 4,554,668 A | 11/1985 | Deman et al. |
| 4,747,137 A | 5/1988 | Matsunaga |
| 4,783,779 A | 11/1988 | Takahata et al. |
| 4,783,780 A | 11/1988 | Alexis |
| 4,975,952 A | 12/1990 | Mabey et al. |
| 5,008,900 A | 4/1991 | Critchlow et al. |

(Continued)

FOREIGN PATENT DOCUMENTS

| AU | 2005319084 | 4/2010 |
| CA | 2348137 | 11/2001 |

(Continued)

OTHER PUBLICATIONS

Kiessling et al., Short-term and long-term diagonalization of correlated MIMO channels with adaptive modulation IEEE International Symposium on Personal, Indoor and Mobile Radio Communications, vol. 2, Sep. 15, 2002, pp. 593-597.

(Continued)

*Primary Examiner* — Phuong Phu
(74) *Attorney, Agent, or Firm* — Howard Seo

(57) ABSTRACT

Techniques for performing rank prediction in a MIMO system are described. Performance metrics for a plurality of ranks are initially determined. Each rank is indicative of a different number of data streams to send simultaneously via a MIMO channel. The performance metrics may relate to the capacity or signal quality of the MIMO channel or the throughput of data transmission sent via the MIMO channel. Adjustments are applied to the performance metrics for the ranks to obtain adjusted performance metrics. The adjustments account for system losses such as losses due to an error correction code used for data transmission, channel estimation errors at a receiver, variation in interference observed by the receiver, variability in transmit power due to power control, and/or other factors. A rank is selected for use based on the adjusted performance metrics for the ranks.

26 Claims, 6 Drawing Sheets

(56) References Cited

U.S. PATENT DOCUMENTS

| | | | |
|---|---|---|---|
| 5,115,248 | A | 5/1992 | Roederer |
| 5,268,694 | A | 12/1993 | Jan et al. |
| 5,282,222 | A | 1/1994 | Fattouche et al. |
| 5,363,408 | A | 11/1994 | Paik et al. |
| 5,371,761 | A | 12/1994 | Daffara et al. |
| 5,384,810 | A | 1/1995 | Amrany |
| 5,406,551 | A | 4/1995 | Saito et al. |
| 5,410,538 | A | 4/1995 | Roche et al. |
| 5,455,839 | A | 10/1995 | Eyuboglu |
| 5,465,253 | A | 11/1995 | Rahnema |
| 5,491,727 | A | 2/1996 | Petit |
| 5,513,379 | A | 4/1996 | Benveniste et al. |
| 5,539,748 | A | 7/1996 | Raith |
| 5,548,582 | A | 8/1996 | Brajal et al. |
| 5,583,869 | A | 12/1996 | Grube et al. |
| 5,594,738 | A | 1/1997 | Crisler et al. |
| 5,604,744 | A | 2/1997 | Andersson et al. |
| 5,612,978 | A | 3/1997 | Blanchard et al. |
| 5,625,876 | A | 4/1997 | Gilhousen et al. |
| 5,684,491 | A | 11/1997 | Newman et al. |
| 5,726,978 | A | 3/1998 | Frodigh et al. |
| 5,732,113 | A | 3/1998 | Schmidl et al. |
| 5,745,487 | A | 4/1998 | Hamaki |
| 5,768,276 | A | 6/1998 | Diachina et al. |
| 5,790,537 | A | 8/1998 | Yoon et al. |
| 5,812,938 | A | 9/1998 | Gilhousen et al. |
| 5,815,488 | A | 9/1998 | Williams et al. |
| 5,822,368 | A | 10/1998 | Wang |
| 5,838,268 | A | 11/1998 | Frenkel |
| 5,867,478 | A | 2/1999 | Baum et al. |
| 5,870,393 | A | 2/1999 | Yano et al. |
| 5,887,023 | A | 3/1999 | Mabuchi |
| 5,907,585 | A | 5/1999 | Suzuki et al. |
| 5,920,571 | A | 7/1999 | Houck et al. |
| 5,926,470 | A | 7/1999 | Tiedemann, Jr. |
| 5,933,421 | A | 8/1999 | Alamouti et al. |
| 5,949,814 | A | 9/1999 | Odenwalder et al. |
| 5,953,325 | A | 9/1999 | Willars |
| 5,955,992 | A | 9/1999 | Shattil |
| 5,956,642 | A | 9/1999 | Larsson et al. |
| 5,995,992 | A | 11/1999 | Eckard |
| 5,999,826 | A | 12/1999 | Whinnett |
| 6,002,942 | A | 12/1999 | Park |
| 6,016,123 | A | 1/2000 | Barton et al. |
| 6,038,263 | A | 3/2000 | Kotzin et al. |
| 6,038,450 | A | 3/2000 | Brink et al. |
| 6,052,364 | A | 4/2000 | Chalmers et al. |
| 6,061,337 | A | 5/2000 | Light et al. |
| 6,067,315 | A | 5/2000 | Sandin |
| 6,075,350 | A | 6/2000 | Peng |
| 6,075,797 | A | 6/2000 | Thomas |
| 6,076,114 | A | 6/2000 | Wesley |
| 6,088,345 | A | 7/2000 | Sakoda et al. |
| 6,108,323 | A | 8/2000 | Gray |
| 6,108,550 | A | 8/2000 | Wiorek et al. |
| 6,112,094 | A | 8/2000 | Dent |
| 6,128,776 | A | 10/2000 | Kang |
| 6,138,037 | A | 10/2000 | Jaamies |
| 6,141,317 | A | 10/2000 | Marchok et al. |
| 6,154,484 | A | 11/2000 | Lee et al. |
| 6,169,910 | B1 | 1/2001 | Tamil et al. |
| 6,172,993 | B1 | 1/2001 | Kim et al. |
| 6,175,550 | B1 | 1/2001 | Van Nee |
| 6,175,650 | B1 | 1/2001 | Sindhu et al. |
| 6,176,550 | B1 | 1/2001 | Lamart et al. |
| 6,198,775 | B1 | 3/2001 | Khayrallah et al. |
| 6,215,983 | B1 | 4/2001 | Dogan et al. |
| 6,226,280 | B1 | 5/2001 | Roark et al. |
| 6,232,918 | B1 | 5/2001 | Wax et al. |
| 6,240,129 | B1 | 5/2001 | Reusens et al. |
| 6,249,683 | B1 | 6/2001 | Lundby et al. |
| 6,256,478 | B1 | 7/2001 | Allen et al. |
| 6,271,946 | B1 | 8/2001 | Chang et al. |
| 6,272,122 | B1 | 8/2001 | Wee |
| 6,310,704 | B1 | 10/2001 | Dogan et al. |
| 6,317,435 | B1 | 11/2001 | Tiedemann, Jr. et al. |
| 6,335,922 | B1 | 1/2002 | Tiedemann, Jr. et al. |
| 6,337,659 | B1 | 1/2002 | Kim |
| 6,337,983 | B1 | 1/2002 | Bonta et al. |
| 6,353,637 | B1 | 3/2002 | Mansour et al. |
| 6,363,060 | B1 | 3/2002 | Sarkar |
| 6,374,115 | B1 | 4/2002 | Barnes et al. |
| 6,377,539 | B1 | 4/2002 | Kang et al. |
| 6,377,809 | B1 | 4/2002 | Rezaiifar et al. |
| 6,388,998 | B1 | 5/2002 | Kasturia |
| 6,393,008 | B1 | 5/2002 | Cheng et al. |
| 6,393,012 | B1 | 5/2002 | Pankaj |
| 6,401,062 | B1 | 6/2002 | Murashima |
| 6,438,369 | B1 | 8/2002 | Huang et al. |
| 6,449,246 | B1 | 9/2002 | Barton et al. |
| 6,466,800 | B1 | 10/2002 | Sydon et al. |
| 6,473,467 | B1 | 10/2002 | Wallace et al. |
| 6,477,317 | B1 | 11/2002 | Itokawa |
| 6,478,422 | B1 | 11/2002 | Hansen |
| 6,483,820 | B1 | 11/2002 | Davidson et al. |
| 6,487,243 | B1 | 11/2002 | Hwang et al. |
| 6,496,790 | B1 | 12/2002 | Kathavate et al. |
| 6,501,810 | B1 | 12/2002 | Karim et al. |
| 6,507,601 | B2 | 1/2003 | Parsa et al. |
| 6,519,462 | B1 | 2/2003 | Lu et al. |
| 6,529,525 | B1 | 3/2003 | Pecen et al. |
| 6,535,666 | B1 | 3/2003 | Dogan et al. |
| 6,539,008 | B1 | 3/2003 | Ahn et al. |
| 6,539,213 | B1 | 3/2003 | Richards et al. |
| 6,542,485 | B1 | 4/2003 | Mujtaba |
| 6,542,743 | B1 | 4/2003 | Soliman |
| 6,563,806 | B1 | 5/2003 | Yano et al. |
| 6,563,881 | B1 | 5/2003 | Sakoda et al. |
| 6,577,739 | B1 | 6/2003 | Hurtig et al. |
| 6,584,140 | B1 | 6/2003 | Lee |
| 6,590,881 | B1 | 7/2003 | Wallace et al. |
| 6,597,746 | B1 | 7/2003 | Amrany et al. |
| 6,601,206 | B1 | 7/2003 | Marvasti |
| 6,614,857 | B1 | 9/2003 | Buehrer et al. |
| 6,625,172 | B2 | 9/2003 | Odenwalder et al. |
| 6,636,568 | B2 | 10/2003 | Kadous |
| 6,654,339 | B1 | 11/2003 | Bohnke et al. |
| 6,654,431 | B1 | 11/2003 | Barton et al. |
| 6,657,949 | B1 | 12/2003 | Jones, IV et al. |
| 6,658,258 | B1 | 12/2003 | Chen et al. |
| 6,674,787 | B1 | 1/2004 | Dick et al. |
| 6,674,810 | B1 | 1/2004 | Cheng |
| 6,675,012 | B2 | 1/2004 | Gray |
| 6,678,318 | B1 | 1/2004 | Lai |
| 6,690,951 | B1 | 2/2004 | Cuffaro et al. |
| 6,693,952 | B1 | 2/2004 | Chuah et al. |
| 6,701,165 | B1 | 3/2004 | Ho et al. |
| 6,704,571 | B1 | 3/2004 | Moon |
| 6,711,400 | B1 | 3/2004 | Aura |
| 6,717,908 | B2 | 4/2004 | Vijayan et al. |
| 6,721,568 | B1 | 4/2004 | Gustavsson et al. |
| 6,724,719 | B1 | 4/2004 | Tong et al. |
| 6,731,602 | B1 | 5/2004 | Watanabe et al. |
| 6,735,244 | B1 | 5/2004 | Hasegawa et al. |
| 6,744,743 | B2 | 6/2004 | Walton et al. |
| 6,748,220 | B1 | 6/2004 | Chow et al. |
| 6,751,444 | B1 | 6/2004 | Meiyappan |
| 6,751,456 | B2 | 6/2004 | Bilgic |
| 6,754,511 | B1 | 6/2004 | Halford et al. |
| 6,763,009 | B1 | 7/2004 | Bedekar et al. |
| 6,765,969 | B1 | 7/2004 | Vook et al. |
| 6,776,165 | B2 | 8/2004 | Jin |
| 6,776,765 | B2 | 8/2004 | Soukup et al. |
| 6,778,513 | B2 | 8/2004 | Kasapi et al. |
| 6,785,341 | B2 | 8/2004 | Walton |
| 6,798,736 | B1 | 9/2004 | Black et al. |
| 6,799,043 | B2 | 9/2004 | Tiedemann, Jr. et al. |
| 6,802,035 | B2 | 10/2004 | Catreux et al. |
| 6,804,307 | B1 | 10/2004 | Popovic |
| 6,813,284 | B2 | 11/2004 | Vayanos et al. |
| 6,821,535 | B2 | 11/2004 | Nurmi |
| 6,828,293 | B2 | 12/2004 | Hazenkamp et al. |
| 6,829,293 | B2 | 12/2004 | Jones et al. |
| 6,831,943 | B1 | 12/2004 | Dabak et al. |

(56) References Cited

U.S. PATENT DOCUMENTS

| | | |
|---|---|---|
| 6,842,487 B1 | 1/2005 | Larsson |
| 6,850,481 B2 | 2/2005 | Wu et al. |
| 6,850,509 B2 | 2/2005 | Lee et al. |
| 6,862,271 B2 | 3/2005 | Medvedev et al. |
| 6,870,808 B1 | 3/2005 | Liu et al. |
| 6,870,826 B1 | 3/2005 | Ishizu |
| 6,904,097 B2 | 6/2005 | Agami et al. |
| 6,904,283 B2 | 6/2005 | Li et al. |
| 6,904,550 B2 | 6/2005 | Sibecas et al. |
| 6,907,020 B2 | 6/2005 | Periyalwar et al. |
| 6,907,269 B2 | 6/2005 | Yamaguchi et al. |
| 6,907,270 B1 | 6/2005 | Blanz |
| 6,909,707 B2 | 6/2005 | Rotstein et al. |
| 6,917,602 B2 | 7/2005 | Toskala et al. |
| 6,917,821 B2 | 7/2005 | Kadous et al. |
| 6,927,728 B2 | 8/2005 | Vook et al. |
| 6,928,047 B1 | 8/2005 | Xia |
| 6,934,266 B2 | 8/2005 | Dulin et al. |
| 6,934,275 B1 | 8/2005 | Love et al. |
| 6,934,340 B1 | 8/2005 | Dollard |
| 6,940,842 B2 | 9/2005 | Proctor, Jr. |
| 6,940,845 B2 | 9/2005 | Benveniste |
| 6,954,448 B2 | 10/2005 | Farley et al. |
| 6,954,481 B1 | 10/2005 | Laroia et al. |
| 6,954,622 B2 | 10/2005 | Nelson et al. |
| 6,961,364 B1 | 11/2005 | Laroia et al. |
| 6,963,543 B2 | 11/2005 | Diep et al. |
| 6,970,682 B2 | 11/2005 | Crilly, Jr. et al. |
| 6,975,868 B2 | 12/2005 | Joshi et al. |
| 6,980,540 B1 | 12/2005 | Laroia et al. |
| 6,985,434 B2 | 1/2006 | Wu et al. |
| 6,985,453 B2 | 1/2006 | Lundby et al. |
| 6,985,466 B1 | 1/2006 | Yun et al. |
| 6,985,498 B2 | 1/2006 | Laroia et al. |
| 6,987,746 B1 | 1/2006 | Song |
| 6,993,342 B1 | 1/2006 | Kuchibhotla et al. |
| 7,002,900 B2 | 2/2006 | Walton et al. |
| 7,006,529 B2 | 2/2006 | Alastalo et al. |
| 7,006,557 B2 | 2/2006 | Subrahmanya et al. |
| 7,006,848 B2 | 2/2006 | Ling |
| 7,009,500 B2 | 3/2006 | Rao et al. |
| 7,010,048 B1 | 3/2006 | Shattil |
| 7,013,143 B2 | 3/2006 | Love et al. |
| 7,016,318 B2 | 3/2006 | Pankaj et al. |
| 7,016,319 B2 | 3/2006 | Baum et al. |
| 7,016,425 B1 | 3/2006 | Kraiem |
| 7,020,110 B2 | 3/2006 | Walton et al. |
| 7,039,356 B2 | 5/2006 | Nguyen |
| 7,039,370 B2 | 5/2006 | Laroia et al. |
| 7,042,856 B2 | 5/2006 | Walton et al. |
| 7,042,857 B2 | 5/2006 | Krishnan et al. |
| 7,047,006 B2 | 5/2006 | Classon et al. |
| 7,050,402 B2 | 5/2006 | Schmidl et al. |
| 7,050,759 B2 | 5/2006 | Gaal et al. |
| 7,054,301 B1 | 5/2006 | Sousa et al. |
| 7,061,898 B2 | 6/2006 | Hashem et al. |
| 7,069,009 B2 | 6/2006 | Li et al. |
| 7,072,315 B1 | 7/2006 | Liu et al. |
| 7,079,867 B2 | 7/2006 | Chun et al. |
| 7,085,574 B2 | 8/2006 | Gaal et al. |
| 7,095,708 B1 | 8/2006 | Alamouti et al. |
| 7,095,709 B2 | 8/2006 | Walton et al. |
| 7,099,299 B2 | 8/2006 | Liang et al. |
| 7,099,630 B2 | 8/2006 | Brunner et al. |
| 7,103,384 B2 | 9/2006 | Chun |
| 7,106,319 B2 | 9/2006 | Ishiyama |
| 7,113,808 B2 | 9/2006 | Hwang et al. |
| 7,120,134 B2 | 10/2006 | Tiedemann, Jr. et al. |
| 7,120,395 B2 | 10/2006 | Tong et al. |
| 7,126,928 B2 | 10/2006 | Tiedemann, Jr. et al. |
| 7,131,086 B2 | 10/2006 | Yamasaki et al. |
| 7,133,460 B2 | 11/2006 | Bae et al. |
| 7,139,328 B2 | 11/2006 | Thomas et al. |
| 7,142,864 B2 | 11/2006 | Laroia et al. |
| 7,145,940 B2 | 12/2006 | Gore |
| 7,145,959 B2 | 12/2006 | Harel et al. |
| 7,149,199 B2 | 12/2006 | Sung et al. |
| 7,149,238 B2 | 12/2006 | Agee et al. |
| 7,151,761 B1 | 12/2006 | Palenius |
| 7,151,936 B2 | 12/2006 | Wager et al. |
| 7,154,936 B2 | 12/2006 | Bjerke et al. |
| 7,155,236 B2 | 12/2006 | Chen et al. |
| 7,161,971 B2 | 1/2007 | Tiedemann, Jr. et al. |
| 7,164,649 B2 | 1/2007 | Walton et al. |
| 7,164,696 B2 | 1/2007 | Sano et al. |
| 7,167,916 B2 | 1/2007 | Willen et al. |
| 7,170,937 B2 | 1/2007 | Zhou |
| 7,177,297 B2 | 2/2007 | Agrawal et al. |
| 7,177,351 B2 | 2/2007 | Kadous |
| 7,180,627 B2 | 2/2007 | Moylan et al. |
| 7,181,170 B2 | 2/2007 | Love et al. |
| 7,184,426 B2 | 2/2007 | Padovani et al. |
| 7,184,713 B2 | 2/2007 | Kadous et al. |
| 7,188,300 B2 | 3/2007 | Eriksson et al. |
| 7,197,282 B2 | 3/2007 | Dent et al. |
| 7,200,177 B2 | 4/2007 | Miyoshi |
| 7,209,712 B2 | 4/2007 | Holtzman |
| 7,215,979 B2 | 5/2007 | Nakagawa et al. |
| 7,230,942 B2 | 6/2007 | Laroia et al. |
| 7,233,634 B1 | 6/2007 | Hassell Sweatman et al. |
| 7,236,747 B1 | 6/2007 | Meacham et al. |
| 7,242,722 B2 | 7/2007 | Krauss et al. |
| 7,243,150 B2 | 7/2007 | Sher et al. |
| 7,248,559 B2 | 7/2007 | Ma et al. |
| 7,248,841 B2 | 7/2007 | Agee et al. |
| 7,254,158 B2 | 8/2007 | Agrawal |
| 7,257,167 B2 | 8/2007 | Lau |
| 7,257,406 B2 | 8/2007 | Ji |
| 7,257,423 B2 | 8/2007 | Iochi |
| 7,260,153 B2 | 8/2007 | Nissensohn |
| 7,280,467 B2 | 10/2007 | Smee et al. |
| 7,289,570 B2 | 10/2007 | Schmidl et al. |
| 7,289,585 B2 | 10/2007 | Sandhu et al. |
| 7,290,195 B2 | 10/2007 | Guo et al. |
| 7,292,651 B2 | 11/2007 | Li |
| 7,292,863 B2 | 11/2007 | Chen et al. |
| 7,295,509 B2 | 11/2007 | Laroia et al. |
| 7,313,086 B2 | 12/2007 | Aizawa |
| 7,313,126 B2 | 12/2007 | Yun et al. |
| 7,313,174 B2 | 12/2007 | Alard et al. |
| 7,313,407 B2 | 12/2007 | Shapira |
| 7,327,812 B2 | 2/2008 | Auer |
| 7,330,701 B2 | 2/2008 | Mukkavilli et al. |
| 7,336,727 B2 | 2/2008 | Mukkavilli et al. |
| 7,349,371 B2 | 3/2008 | Schein et al. |
| 7,349,667 B2 | 3/2008 | Magee et al. |
| 7,356,000 B2 | 4/2008 | Oprescu-Surcobe et al. |
| 7,356,005 B2 | 4/2008 | Derryberry et al. |
| 7,356,073 B2 | 4/2008 | Heikkila |
| 7,359,327 B2 | 4/2008 | Oshiba |
| 7,363,055 B2 | 4/2008 | Castrogiovanni et al. |
| 7,366,223 B1 | 4/2008 | Chen et al. |
| 7,366,253 B2 | 4/2008 | Kim et al. |
| 7,366,520 B2 | 4/2008 | Haustein et al. |
| 7,369,531 B2 | 5/2008 | Cho et al. |
| 7,372,911 B1 | 5/2008 | Lindskog et al. |
| 7,372,912 B2 | 5/2008 | Seo et al. |
| 7,379,489 B2 | 5/2008 | Zuniga et al. |
| 7,382,764 B2 | 6/2008 | Uehara |
| 7,392,014 B2 | 6/2008 | Baker et al. |
| 7,394,865 B2 | 7/2008 | Borran et al. |
| 7,403,745 B2 | 7/2008 | Dominique et al. |
| 7,403,748 B1 * | 7/2008 | Keskitalo et al. ............. 455/101 |
| 7,406,119 B2 | 7/2008 | Yamano et al. |
| 7,406,336 B2 | 7/2008 | Astely et al. |
| 7,411,898 B2 | 8/2008 | Erlich et al. |
| 7,412,212 B2 | 8/2008 | Hottinen |
| 7,418,043 B2 | 8/2008 | Shattil |
| 7,418,246 B2 | 8/2008 | Kim et al. |
| 7,423,991 B2 | 9/2008 | Cho et al. |
| 7,426,426 B2 | 9/2008 | Van Baren |
| 7,428,426 B2 | 9/2008 | Kiran et al. |
| 7,433,661 B2 | 10/2008 | Kogiantis et al. |
| 7,437,164 B2 | 10/2008 | Agrawal et al. |

(56) References Cited

U.S. PATENT DOCUMENTS

| | | | |
|---|---|---|---|
| 7,443,835 B2 | 10/2008 | Lakshmi Narayanan et al. | |
| 7,447,270 B1 | 11/2008 | Hottinen | |
| 7,450,548 B2 * | 11/2008 | Haustein et al. | 370/334 |
| 7,463,698 B2 | 12/2008 | Fujii et al. | |
| 7,468,943 B2 | 12/2008 | Gu et al. | |
| 7,469,011 B2 | 12/2008 | Lin et al. | |
| 7,471,963 B2 | 12/2008 | Kim et al. | |
| 7,483,408 B2 | 1/2009 | Bevan et al. | |
| 7,483,719 B2 | 1/2009 | Kim et al. | |
| 7,486,735 B2 | 2/2009 | Dubuc et al. | |
| 7,492,788 B2 | 2/2009 | Zhang et al. | |
| 7,499,393 B2 | 3/2009 | Ozluturk | |
| 7,508,748 B2 | 3/2009 | Kadous | |
| 7,508,842 B2 | 3/2009 | Baum et al. | |
| 7,512,096 B2 | 3/2009 | Kuzminskiy et al. | |
| 7,545,867 B1 * | 6/2009 | Lou et al. | 375/259 |
| 7,548,506 B2 | 6/2009 | Ma et al. | |
| 7,551,546 B2 | 6/2009 | Ma et al. | |
| 7,551,564 B2 | 6/2009 | Mattina | |
| 7,558,293 B2 | 7/2009 | Choi et al. | |
| 7,573,900 B2 | 8/2009 | Kim et al. | |
| 7,616,955 B2 | 11/2009 | Kim | |
| 7,623,442 B2 | 11/2009 | Laroia et al. | |
| 7,627,051 B2 | 12/2009 | Shen et al. | |
| 7,664,061 B2 | 2/2010 | Hottinen | |
| 7,676,007 B1 | 3/2010 | Choi et al. | |
| 7,684,507 B2 | 3/2010 | Levy | |
| 7,724,777 B2 | 5/2010 | Sutivong et al. | |
| 7,899,497 B2 * | 3/2011 | Kish et al. | 455/562.1 |
| 7,916,624 B2 | 3/2011 | Laroia et al. | |
| 7,924,699 B2 | 4/2011 | Laroia et al. | |
| 7,990,843 B2 | 8/2011 | Laroia et al. | |
| 7,990,844 B2 | 8/2011 | Laroia et al. | |
| 8,031,583 B2 | 10/2011 | Classon et al. | |
| 8,095,141 B2 | 1/2012 | Teague | |
| 8,098,568 B2 | 1/2012 | Laroia et al. | |
| 8,098,569 B2 | 1/2012 | Laroia et al. | |
| 8,446,892 B2 | 5/2013 | Ji et al. | |
| 8,462,859 B2 | 6/2013 | Sampath et al. | |
| 8,477,684 B2 | 7/2013 | Khandekar et al. | |
| 2001/0024427 A1 | 9/2001 | Suzuki | |
| 2001/0030948 A1 | 10/2001 | Tiedemann, Jr. | |
| 2001/0053140 A1 | 12/2001 | Choi et al. | |
| 2001/0055293 A1 | 12/2001 | Parsa et al. | |
| 2001/0055294 A1 | 12/2001 | Motoyoshi | |
| 2002/0003792 A1 | 1/2002 | Schmidl et al. | |
| 2002/0015405 A1 | 2/2002 | Sepponen et al. | |
| 2002/0018157 A1 | 2/2002 | Zhang et al. | |
| 2002/0044524 A1 | 4/2002 | Laroia et al. | |
| 2002/0061742 A1 | 5/2002 | Lapaille et al. | |
| 2002/0077152 A1 | 6/2002 | Johnson et al. | |
| 2002/0085521 A1 | 7/2002 | Tripathi et al. | |
| 2002/0090004 A1 | 7/2002 | Rinchiuso | |
| 2002/0090024 A1 | 7/2002 | Tan | |
| 2002/0122383 A1 | 9/2002 | Wu et al. | |
| 2002/0128035 A1 | 9/2002 | Jokinen et al. | |
| 2002/0159422 A1 | 10/2002 | Li et al. | |
| 2002/0160781 A1 | 10/2002 | Bark et al. | |
| 2002/0168946 A1 | 11/2002 | Aizawa et al. | |
| 2002/0172293 A1 | 11/2002 | Kuchi et al. | |
| 2002/0176398 A1 | 11/2002 | Nidda | |
| 2002/0193146 A1 | 12/2002 | Wallace et al. | |
| 2003/0002464 A1 | 1/2003 | Rezaiifar et al. | |
| 2003/0035491 A1 | 2/2003 | Walton et al. | |
| 2003/0040283 A1 | 2/2003 | Kawai et al. | |
| 2003/0043732 A1 | 3/2003 | Walton et al. | |
| 2003/0043764 A1 | 3/2003 | Kim et al. | |
| 2003/0063579 A1 | 4/2003 | Lee | |
| 2003/0068983 A1 | 4/2003 | Kim et al. | |
| 2003/0072280 A1 | 4/2003 | McFarland et al. | |
| 2003/0072395 A1 | 4/2003 | Jia et al. | |
| 2003/0073409 A1 | 4/2003 | Nobukiyo et al. | |
| 2003/0073464 A1 | 4/2003 | Giannakis et al. | |
| 2003/0076878 A1 | 4/2003 | Jones et al. | |
| 2003/0076890 A1 | 4/2003 | Hochwald et al. | |
| 2003/0086393 A1 | 5/2003 | Vasudevan et al. | |
| 2003/0096579 A1 | 5/2003 | Ito et al. | |
| 2003/0103520 A1 | 6/2003 | Chen et al. | |
| 2003/0112745 A1 | 6/2003 | Zhuang et al. | |
| 2003/0123414 A1 | 7/2003 | Tong et al. | |
| 2003/0125040 A1 | 7/2003 | Walton et al. | |
| 2003/0142648 A1 | 7/2003 | Semper | |
| 2003/0147371 A1 | 8/2003 | Choi et al. | |
| 2003/0181170 A1 | 9/2003 | Sim | |
| 2003/0185310 A1 | 10/2003 | Ketchum et al. | |
| 2003/0190897 A1 | 10/2003 | Lei et al. | |
| 2003/0193915 A1 | 10/2003 | Lee et al. | |
| 2003/0202491 A1 | 10/2003 | Tiedemann, Jr. et al. | |
| 2003/0223452 A1 | 12/2003 | Toskala et al. | |
| 2003/0228850 A1 | 12/2003 | Hwang | |
| 2003/0235255 A1 | 12/2003 | Ketchum et al. | |
| 2004/0002364 A1 * | 1/2004 | Trikkonen et al. | 455/562.1 |
| 2004/0015692 A1 | 1/2004 | Green et al. | |
| 2004/0017785 A1 | 1/2004 | Zelst | |
| 2004/0038697 A1 | 2/2004 | Attar et al. | |
| 2004/0048609 A1 | 3/2004 | Kosaka | |
| 2004/0058687 A1 | 3/2004 | Kim et al. | |
| 2004/0066761 A1 | 4/2004 | Giannakis et al. | |
| 2004/0072565 A1 | 4/2004 | Nobukiyo et al. | |
| 2004/0076185 A1 | 4/2004 | Kim et al. | |
| 2004/0077379 A1 | 4/2004 | Smith et al. | |
| 2004/0081195 A1 | 4/2004 | El-Maleh et al. | |
| 2004/0086055 A1 | 5/2004 | Li | |
| 2004/0087325 A1 | 5/2004 | Cheng et al. | |
| 2004/0097215 A1 | 5/2004 | Abe et al. | |
| 2004/0098505 A1 | 5/2004 | Clemmensen | |
| 2004/0105489 A1 | 6/2004 | Kim et al. | |
| 2004/0114618 A1 | 6/2004 | Tong et al. | |
| 2004/0120411 A1 * | 6/2004 | Walton et al. | 375/260 |
| 2004/0125792 A1 | 7/2004 | Bradbury et al. | |
| 2004/0136344 A1 | 7/2004 | Kim et al. | |
| 2004/0136349 A1 | 7/2004 | Walton et al. | |
| 2004/0156328 A1 | 8/2004 | Walton et al. | |
| 2004/0160914 A1 | 8/2004 | Sarkar | |
| 2004/0160933 A1 | 8/2004 | Odenwalder et al. | |
| 2004/0166867 A1 | 8/2004 | Hawe | |
| 2004/0166887 A1 | 8/2004 | Laroia et al. | |
| 2004/0170152 A1 | 9/2004 | Nagao et al. | |
| 2004/0170157 A1 | 9/2004 | Kim et al. | |
| 2004/0171384 A1 | 9/2004 | Holma et al. | |
| 2004/0179627 A1 | 9/2004 | Ketchum et al. | |
| 2004/0185792 A1 | 9/2004 | Alexiou et al. | |
| 2004/0190486 A1 | 9/2004 | Oshiba | |
| 2004/0202257 A1 | 10/2004 | Mehta et al. | |
| 2004/0208138 A1 | 10/2004 | Hayashi et al. | |
| 2004/0219819 A1 | 11/2004 | Di Mascio | |
| 2004/0219919 A1 | 11/2004 | Whinnett et al. | |
| 2004/0224711 A1 | 11/2004 | Panchal et al. | |
| 2004/0228313 A1 | 11/2004 | Cheng et al. | |
| 2004/0240419 A1 | 12/2004 | Abrishamkar et al. | |
| 2004/0240572 A1 | 12/2004 | Brutel et al. | |
| 2004/0248604 A1 | 12/2004 | Vaidyanathan | |
| 2004/0252529 A1 | 12/2004 | Huber et al. | |
| 2004/0252629 A1 | 12/2004 | Hasegawa et al. | |
| 2004/0252655 A1 | 12/2004 | Lim et al. | |
| 2004/0252662 A1 | 12/2004 | Cho | |
| 2004/0257979 A1 | 12/2004 | Ro et al. | |
| 2004/0264507 A1 | 12/2004 | Cho et al. | |
| 2005/0002412 A1 | 1/2005 | Sagfors et al. | |
| 2005/0002440 A1 | 1/2005 | Alamouti et al. | |
| 2005/0002468 A1 | 1/2005 | Walton et al. | |
| 2005/0003782 A1 | 1/2005 | Wintzell | |
| 2005/0008091 A1 | 1/2005 | Boutros et al. | |
| 2005/0009486 A1 | 1/2005 | Al-Dhahir et al. | |
| 2005/0013263 A1 | 1/2005 | Kim et al. | |
| 2005/0030886 A1 | 2/2005 | Wu et al. | |
| 2005/0034079 A1 | 2/2005 | Gunasekar et al. | |
| 2005/0041611 A1 | 2/2005 | Sandhu | |
| 2005/0041618 A1 | 2/2005 | Wei et al. | |
| 2005/0041775 A1 | 2/2005 | Batzinger et al. | |
| 2005/0044206 A1 | 2/2005 | Johansson et al. | |
| 2005/0047517 A1 | 3/2005 | Georgios et al. | |
| 2005/0052991 A1 | 3/2005 | Kadous | |
| 2005/0053081 A1 | 3/2005 | Andersson et al. | |

(56) References Cited

U.S. PATENT DOCUMENTS

| | | |
|---|---|---|
| 2005/0063298 A1 | 3/2005 | Ling et al. |
| 2005/0068921 A1 | 3/2005 | Liu |
| 2005/0073976 A1 | 4/2005 | Fujii |
| 2005/0075073 A1 | 4/2005 | Kadous et al. |
| 2005/0085236 A1 | 4/2005 | Gerlach et al. |
| 2005/0088959 A1 | 4/2005 | Kadous |
| 2005/0111397 A1 | 5/2005 | Attar et al. |
| 2005/0122898 A1 | 6/2005 | Jang et al. |
| 2005/0135324 A1 | 6/2005 | Kim et al. |
| 2005/0135498 A1 | 6/2005 | Yee |
| 2005/0138671 A1 | 6/2005 | Love et al. |
| 2005/0141624 A1 | 6/2005 | Lakshmipathi et al. |
| 2005/0147024 A1 | 7/2005 | Jung et al. |
| 2005/0157807 A1 | 7/2005 | Shim et al. |
| 2005/0159162 A1 | 7/2005 | Park |
| 2005/0164709 A1 | 7/2005 | Balasubramanian et al. |
| 2005/0165949 A1 | 7/2005 | Teague |
| 2005/0174981 A1 | 8/2005 | Heath et al. |
| 2005/0175070 A1 | 8/2005 | Grob et al. |
| 2005/0180311 A1 | 8/2005 | Wang et al. |
| 2005/0180313 A1 | 8/2005 | Kim et al. |
| 2005/0192011 A1 | 9/2005 | Hong et al. |
| 2005/0195733 A1 | 9/2005 | Walton et al. |
| 2005/0195852 A1 | 9/2005 | Vayanos et al. |
| 2005/0195886 A1 | 9/2005 | Lampinen et al. |
| 2005/0201296 A1 | 9/2005 | Vannithamby et al. |
| 2005/0207367 A1 | 9/2005 | Onggosanusi et al. |
| 2005/0239465 A1 | 10/2005 | Lee et al. |
| 2005/0243791 A1 | 11/2005 | Park et al. |
| 2005/0246548 A1 | 11/2005 | Laitinen |
| 2005/0249266 A1 | 11/2005 | Brown et al. |
| 2005/0254467 A1 | 11/2005 | Li |
| 2005/0254477 A1 | 11/2005 | Lee et al. |
| 2005/0254556 A1 | 11/2005 | Fujii et al. |
| 2005/0259005 A1 | 11/2005 | Chiang et al. |
| 2005/0259723 A1 | 11/2005 | Blanchard |
| 2005/0259757 A1 | 11/2005 | Wu et al. |
| 2005/0265293 A1 | 12/2005 | Ro et al. |
| 2005/0265470 A1 | 12/2005 | Kishigami et al. |
| 2005/0276347 A1 | 12/2005 | Mujtaba et al. |
| 2005/0276348 A1 | 12/2005 | Vandenameele |
| 2005/0277423 A1 | 12/2005 | Sandhu et al. |
| 2005/0281290 A1 | 12/2005 | Khandekar et al. |
| 2005/0282500 A1 | 12/2005 | Wang et al. |
| 2005/0286408 A1 | 12/2005 | Jin et al. |
| 2005/0286465 A1 | 12/2005 | Zhuang et al. |
| 2005/0289256 A1 | 12/2005 | Cudak et al. |
| 2006/0002451 A1 | 1/2006 | Fukuta et al. |
| 2006/0013285 A1 | 1/2006 | Kobayashi et al. |
| 2006/0018336 A1 | 1/2006 | Sutivong |
| 2006/0018347 A1 | 1/2006 | Agrawal |
| 2006/0018397 A1 | 1/2006 | Sampath |
| 2006/0026344 A1 | 2/2006 | Sun Hsu et al. |
| 2006/0029289 A1 | 2/2006 | Yamaguchi et al. |
| 2006/0034173 A1 | 2/2006 | Teague et al. |
| 2006/0039332 A1 | 2/2006 | Kotzin |
| 2006/0039344 A1 | 2/2006 | Khan |
| 2006/0039500 A1 | 2/2006 | Yun et al. |
| 2006/0040655 A1 | 2/2006 | Kim |
| 2006/0050770 A1 | 3/2006 | Wallace et al. |
| 2006/0056340 A1 | 3/2006 | Hottinen et al. |
| 2006/0057958 A1 | 3/2006 | Ngo et al. |
| 2006/0067421 A1 | 3/2006 | Walton et al. |
| 2006/0078075 A1 | 4/2006 | Stamoulis et al. |
| 2006/0083159 A1 | 4/2006 | Laroia et al. |
| 2006/0083183 A1 | 4/2006 | Teague et al. |
| 2006/0092054 A1 | 5/2006 | Li et al. |
| 2006/0104333 A1 | 5/2006 | Rainbolt et al. |
| 2006/0104381 A1 | 5/2006 | Menon et al. |
| 2006/0111054 A1 | 5/2006 | Pan et al. |
| 2006/0114858 A1 | 6/2006 | Walton |
| 2006/0120469 A1 | 6/2006 | Maltsev et al. |
| 2006/0120471 A1 | 6/2006 | Learned et al. |
| 2006/0126491 A1 | 6/2006 | Ro et al. |
| 2006/0133269 A1 | 6/2006 | Prakash et al. |
| 2006/0133455 A1 | 6/2006 | Agrawal et al. |
| 2006/0133521 A1 | 6/2006 | Sampath et al. |
| 2006/0140289 A1 | 6/2006 | Mandyam et al. |
| 2006/0146867 A1 | 7/2006 | Lee et al. |
| 2006/0153239 A1 | 7/2006 | Julian et al. |
| 2006/0155534 A1 | 7/2006 | Lin et al. |
| 2006/0156199 A1 | 7/2006 | Palanki et al. |
| 2006/0172704 A1 | 8/2006 | Nishio et al. |
| 2006/0189321 A1 | 8/2006 | Oh et al. |
| 2006/0203708 A1 | 9/2006 | Sampath et al. |
| 2006/0203794 A1 | 9/2006 | Sampath et al. |
| 2006/0203891 A1 | 9/2006 | Sampath et al. |
| 2006/0203932 A1 | 9/2006 | Palanki et al. |
| 2006/0209670 A1 | 9/2006 | Gorokhov et al. |
| 2006/0209732 A1 | 9/2006 | Gorokhov et al. |
| 2006/0209754 A1 | 9/2006 | Ji et al. |
| 2006/0209764 A1 | 9/2006 | Kim et al. |
| 2006/0209973 A1 | 9/2006 | Gorokhov et al. |
| 2006/0215777 A1 | 9/2006 | Krishnamoorthi |
| 2006/0218459 A1 | 9/2006 | Hedberg |
| 2006/0223449 A1 | 10/2006 | Sampath et al. |
| 2006/0233124 A1 | 10/2006 | Palanki |
| 2006/0233131 A1 | 10/2006 | Gore et al. |
| 2006/0262754 A1 | 11/2006 | Andersson et al. |
| 2006/0270427 A1 | 11/2006 | Shida et al. |
| 2006/0274836 A1 | 12/2006 | Sampath et al. |
| 2006/0285485 A1 | 12/2006 | Agrawal et al. |
| 2006/0285515 A1 | 12/2006 | Julian |
| 2006/0286974 A1 | 12/2006 | Gore et al. |
| 2006/0286982 A1 | 12/2006 | Prakash et al. |
| 2006/0286995 A1 | 12/2006 | Onggosanusi et al. |
| 2006/0291371 A1 | 12/2006 | Sutivong et al. |
| 2006/0292989 A1 | 12/2006 | Gerlach et al. |
| 2007/0004430 A1 | 1/2007 | Hyun et al. |
| 2007/0009011 A1 | 1/2007 | Coulson |
| 2007/0019596 A1 | 1/2007 | Barriac |
| 2007/0025345 A1 | 2/2007 | Bachl et al. |
| 2007/0041404 A1 | 2/2007 | Palanki et al. |
| 2007/0041457 A1 | 2/2007 | Kadous et al. |
| 2007/0047485 A1 | 3/2007 | Gorokhov et al. |
| 2007/0047495 A1 | 3/2007 | Ji et al. |
| 2007/0049218 A1 | 3/2007 | Gorokhov et al. |
| 2007/0053282 A1 | 3/2007 | Tong et al. |
| 2007/0053383 A1 | 3/2007 | Choi et al. |
| 2007/0060178 A1 | 3/2007 | Gorokhov et al. |
| 2007/0064669 A1 | 3/2007 | Classon et al. |
| 2007/0071147 A1 | 3/2007 | Sampath |
| 2007/0097853 A1 | 5/2007 | Khandekar et al. |
| 2007/0097889 A1 | 5/2007 | Wang et al. |
| 2007/0097897 A1 | 5/2007 | Teague et al. |
| 2007/0097908 A1 | 5/2007 | Khandekar et al. |
| 2007/0097909 A1 | 5/2007 | Khandekar et al. |
| 2007/0097910 A1 | 5/2007 | Ji et al. |
| 2007/0097922 A1 | 5/2007 | Parekh et al. |
| 2007/0097927 A1 | 5/2007 | Gorokhov et al. |
| 2007/0097942 A1 | 5/2007 | Gorokhov et al. |
| 2007/0097981 A1 | 5/2007 | Papasakellariou |
| 2007/0098050 A1 | 5/2007 | Khandekar et al. |
| 2007/0098120 A1 | 5/2007 | Wang |
| 2007/0110172 A1 | 5/2007 | Faulkner et al. |
| 2007/0115795 A1 | 5/2007 | Gore et al. |
| 2007/0149194 A1 | 6/2007 | Das et al. |
| 2007/0149228 A1 | 6/2007 | Das |
| 2007/0159969 A1 | 7/2007 | Das et al. |
| 2007/0160115 A1 | 7/2007 | Palanki et al. |
| 2007/0165738 A1 | 7/2007 | Barriac et al. |
| 2007/0177631 A1 | 8/2007 | Popovic et al. |
| 2007/0177681 A1 | 8/2007 | Choi et al. |
| 2007/0183303 A1 | 8/2007 | Pi et al. |
| 2007/0183386 A1 | 8/2007 | Muharemovic et al. |
| 2007/0207812 A1 | 9/2007 | Borran et al. |
| 2007/0211616 A1 | 9/2007 | Khandekar et al. |
| 2007/0211667 A1 | 9/2007 | Agrawal et al. |
| 2007/0230324 A1 | 10/2007 | Li et al. |
| 2007/0242653 A1 | 10/2007 | Yang et al. |
| 2007/0263743 A1 | 11/2007 | Lee et al. |
| 2007/0280336 A1 | 12/2007 | Zhang et al. |
| 2007/0281702 A1 | 12/2007 | Lim et al. |
| 2008/0039129 A1 | 2/2008 | Li et al. |

(56) References Cited

U.S. PATENT DOCUMENTS

| | | |
|---|---|---|
| 2008/0063099 A1 | 3/2008 | Laroia et al. |
| 2008/0095223 A1 | 4/2008 | Tong et al. |
| 2008/0095262 A1 | 4/2008 | Ho et al. |
| 2008/0151829 A1 | 6/2008 | Khandekar et al. |
| 2008/0181139 A1 | 7/2008 | Rangarajan et al. |
| 2008/0214222 A1 | 9/2008 | Atarashi et al. |
| 2008/0253279 A1 | 10/2008 | Ma et al. |
| 2008/0267157 A1 | 10/2008 | Lee et al. |
| 2008/0299983 A1 | 12/2008 | Kwak et al. |
| 2009/0003466 A1 | 1/2009 | Taherzadehboroujeni et al. |
| 2009/0010351 A1 | 1/2009 | Laroia et al. |
| 2009/0022098 A1 | 1/2009 | Novak et al. |
| 2009/0041150 A1 | 2/2009 | Tsai et al. |
| 2009/0110103 A1 | 4/2009 | Maltsev et al. |
| 2009/0180459 A1 | 7/2009 | Orlik et al. |
| 2009/0197646 A1 | 8/2009 | Tamura et al. |
| 2009/0201826 A1 | 8/2009 | Gorokhov et al. |
| 2009/0201872 A1 | 8/2009 | Gorokhov et al. |
| 2009/0213750 A1 | 8/2009 | Gorokhov et al. |
| 2009/0213950 A1 | 8/2009 | Gorokhov et al. |
| 2009/0262641 A1 | 10/2009 | Laroia et al. |
| 2009/0262699 A1 | 10/2009 | Wengerter et al. |
| 2009/0285163 A1 | 11/2009 | Zhang et al. |
| 2009/0287977 A1 | 11/2009 | Chang et al. |
| 2010/0135242 A1 | 6/2010 | Nam et al. |
| 2010/0220800 A1 | 9/2010 | Erell et al. |
| 2010/0232384 A1 | 9/2010 | Farajidana et al. |
| 2010/0238902 A1 | 9/2010 | Ji et al. |
| 2010/0254263 A1 | 10/2010 | Chen et al. |
| 2011/0064070 A1 | 3/2011 | Gore et al. |
| 2011/0235733 A1 | 9/2011 | Laroia et al. |
| 2011/0235745 A1 | 9/2011 | Laroia et al. |
| 2011/0235746 A1 | 9/2011 | Laroia et al. |
| 2011/0235747 A1 | 9/2011 | Laroia et al. |
| 2011/0306291 A1 | 12/2011 | Ma et al. |
| 2012/0002623 A1 | 1/2012 | Khandekar et al. |
| 2012/0063441 A1 | 3/2012 | Palanki |
| 2012/0120925 A1 | 5/2012 | Kadous et al. |
| 2012/0140798 A1 | 6/2012 | Kadous et al. |
| 2012/0140838 A1 | 6/2012 | Kadous et al. |
| 2013/0016678 A1 | 1/2013 | Laroia et al. |
| 2013/0208681 A1 | 8/2013 | Gore et al. |

FOREIGN PATENT DOCUMENTS

| | | |
|---|---|---|
| CA | 2477536 | 9/2003 |
| CA | 2540688 | 5/2005 |
| CA | 2577369 | 3/2006 |
| CL | 19931400 | 12/1994 |
| CL | 8461997 | 1/1998 |
| CL | 009531977 | 1/1998 |
| CL | 22032006 | 2/2007 |
| CL | 29032006 | 5/2007 |
| CL | 29062006 | 5/2007 |
| CL | 29042006 | 6/2007 |
| CL | 29022006 | 7/2007 |
| CL | 29082006 | 10/2007 |
| CL | 29012006 | 1/2010 |
| CL | 29072006 | 1/2010 |
| CN | 1252919 | 5/2000 |
| CN | 1267437 | 9/2000 |
| CN | 1284795 | 2/2001 |
| CN | 1296682 | 5/2001 |
| CN | 1344451 | 4/2002 |
| CN | 1346221 | 4/2002 |
| CN | 1383631 | 12/2002 |
| CN | 1386344 | 12/2002 |
| CN | 1402916 A | 3/2003 |
| CN | 1424835 | 6/2003 |
| CN | 1132474 C | 12/2003 |
| CN | 1467938 | 1/2004 |
| CN | 1520220 | 8/2004 |
| CN | 1525678 | 9/2004 |
| CN | 1636346 | 7/2005 |
| CN | 1642051 A | 7/2005 |
| CN | 1647436 | 7/2005 |
| CN | 1487755 | 4/2007 |
| DE | 19800953 C1 | 7/1999 |
| DE | 19957288 C1 | 5/2001 |
| DE | 10240138 | 8/2003 |
| DE | 102 54 384 A1 | 6/2006 |
| EP | 0488976 A2 | 6/1992 |
| EP | 0568291 A2 | 11/1993 |
| EP | 0786889 A1 | 7/1997 |
| EP | 0805576 A2 | 11/1997 |
| EP | 0807989 A1 | 11/1997 |
| EP | 0844796 A2 | 5/1998 |
| EP | 0981222 A2 | 2/2000 |
| EP | 1001570 A2 | 5/2000 |
| EP | 1047209 A1 | 10/2000 |
| EP | 1061687 A1 | 12/2000 |
| EP | 1091516 A1 | 4/2001 |
| EP | 1093241 A1 | 4/2001 |
| EP | 1148673 A2 | 10/2001 |
| EP | 1180907 A2 | 2/2002 |
| EP | 1187506 A1 | 3/2002 |
| EP | 1204217 A1 | 5/2002 |
| EP | 1255369 A1 | 11/2002 |
| EP | 1267513 A2 | 12/2002 |
| EP | 1286490 A2 | 2/2003 |
| EP | 1335504 A2 | 8/2003 |
| EP | 1376920 A1 | 1/2004 |
| EP | 1392073 A1 | 2/2004 |
| EP | 1434365 A2 | 6/2004 |
| EP | 1441469 A2 | 7/2004 |
| EP | 1445873 A2 | 8/2004 |
| EP | 1465449 A1 | 10/2004 |
| EP | 1478204 A2 | 11/2004 |
| EP | 1507421 A1 | 2/2005 |
| EP | 1513356 A2 | 3/2005 |
| EP | 1531575 A2 | 5/2005 |
| EP | 1533950 A1 | 5/2005 |
| EP | 1538863 A1 | 6/2005 |
| EP | 1542488 A1 | 6/2005 |
| EP | 1601149 A2 | 11/2005 |
| EP | 1643669 A1 | 4/2006 |
| EP | 1898542 A1 | 3/2008 |
| EP | 1941693 | 7/2011 |
| FR | 2584884 A1 | 1/1987 |
| GB | 2279540 A | 1/1995 |
| GB | 2348776 A | 10/2000 |
| GB | 2412541 | 9/2005 |
| IL | 167573 | 2/2011 |
| IL | 201872 | 5/2012 |
| JP | H04111544 A | 4/1992 |
| JP | 4301931 A | 10/1992 |
| JP | 7336323 A | 12/1995 |
| JP | 8116329 A | 5/1996 |
| JP | 08288927 | 11/1996 |
| JP | 9008725 A | 1/1997 |
| JP | H09501548 A | 2/1997 |
| JP | 9131342 | 5/1997 |
| JP | 9182148 A | 7/1997 |
| JP | 09214404 | 8/1997 |
| JP | 9284200 A | 10/1997 |
| JP | 10117162 | 5/1998 |
| JP | H10210000 A | 8/1998 |
| JP | 10322304 | 12/1998 |
| JP | 11191756 A | 7/1999 |
| JP | 11196109 | 7/1999 |
| JP | 11508417 T | 7/1999 |
| JP | 11239155 A | 8/1999 |
| JP | 11298954 | 10/1999 |
| JP | 11331927 A | 11/1999 |
| JP | 2000102065 A | 4/2000 |
| JP | 2000184425 | 6/2000 |
| JP | 2000511750 A | 9/2000 |
| JP | 2000332724 | 11/2000 |
| JP | 2001016644 A2 | 1/2001 |
| JP | 2001045573 A | 2/2001 |
| JP | 2001057545 A | 2/2001 |
| JP | 2001156732 A | 6/2001 |
| JP | 2001238269 | 8/2001 |

(56) References Cited

FOREIGN PATENT DOCUMENTS

| | | |
|---|---|---|
| JP | 2001245355 A | 9/2001 |
| JP | 2001249802 | 9/2001 |
| JP | 2001285927 A | 10/2001 |
| JP | 2001521698 A | 11/2001 |
| JP | 2001526012 | 12/2001 |
| JP | 2002026790 | 1/2002 |
| JP | 2002515203 T | 5/2002 |
| JP | 2002290148 A | 10/2002 |
| JP | 2002534925 A | 10/2002 |
| JP | 2002534941 | 10/2002 |
| JP | 2003032218 | 1/2003 |
| JP | 2003500909 | 1/2003 |
| JP | 200369472 | 3/2003 |
| JP | 2003101515 | 4/2003 |
| JP | 2003169367 A | 6/2003 |
| JP | 20031744226 | 6/2003 |
| JP | 2003199173 A | 7/2003 |
| JP | 2003520523 | 7/2003 |
| JP | 2003249907 A | 9/2003 |
| JP | 2003292667 A | 10/2003 |
| JP | 2003318857 A | 11/2003 |
| JP | 2003347985 | 12/2003 |
| JP | 2003348047 | 12/2003 |
| JP | 2004007643 A | 1/2004 |
| JP | 2004023716 | 1/2004 |
| JP | 2004048716 | 2/2004 |
| JP | 200472457 | 3/2004 |
| JP | 2004072157 A | 3/2004 |
| JP | 2004096142 A | 3/2004 |
| JP | 2004507950 A | 3/2004 |
| JP | 2004153676 | 5/2004 |
| JP | 2004158901 A | 6/2004 |
| JP | 2004162388 A | 6/2004 |
| JP | 2004194262 A | 7/2004 |
| JP | 2004201296 A | 7/2004 |
| JP | 2004215022 A | 7/2004 |
| JP | 2004221972 | 8/2004 |
| JP | 2004266818 | 9/2004 |
| JP | 2004529524 T | 9/2004 |
| JP | 2004297276 A | 10/2004 |
| JP | 2004297370 A | 10/2004 |
| JP | 2004297756 | 10/2004 |
| JP | 2004534456 | 11/2004 |
| JP | 2004535106 A | 11/2004 |
| JP | 2005006337 | 1/2005 |
| JP | 2005020530 | 1/2005 |
| JP | 2005502218 T | 1/2005 |
| JP | 2005506757 | 3/2005 |
| JP | 2005130491 A | 5/2005 |
| JP | 2005197772 | 7/2005 |
| JP | 2005203961 | 7/2005 |
| JP | 2005521327 | 7/2005 |
| JP | 2005521358 | 7/2005 |
| JP | 2006505172 | 2/2006 |
| JP | 2006505230 A | 2/2006 |
| JP | 2006506860 A | 2/2006 |
| JP | 2006211537 A | 8/2006 |
| JP | 2006518173 A | 8/2006 |
| JP | 2007500486 A | 1/2007 |
| JP | 2007503790 | 2/2007 |
| JP | 2007519281 | 7/2007 |
| JP | 2007525043 A | 8/2007 |
| JP | 2007527127 | 9/2007 |
| JP | 2008505587 A | 2/2008 |
| JP | 2008535398 | 8/2008 |
| JP | 4188372 B2 | 11/2008 |
| JP | 2008546314 | 12/2008 |
| JP | 04694628 | 6/2011 |
| KR | 0150275 B1 | 11/1998 |
| KR | 20000060428 | 10/2000 |
| KR | 100291476 B1 | 3/2001 |
| KR | 20010056333 | 4/2001 |
| KR | 20010087715 A | 9/2001 |
| KR | 20030007965 | 1/2003 |
| KR | 20030035969 A | 5/2003 |
| KR | 20040063057 A | 7/2004 |
| KR | 200471652 | 8/2004 |
| KR | 20040103441 A | 12/2004 |
| KR | 20050061559 | 6/2005 |
| KR | 20050063826 A | 6/2005 |
| KR | 100606099 | 7/2006 |
| RU | 95121152 | 12/1997 |
| RU | 2141168 | 11/1999 |
| RU | 2141706 C1 | 11/1999 |
| RU | 2159007 C2 | 11/2000 |
| RU | 2162275 C2 | 1/2001 |
| RU | 2192094 | 10/2002 |
| RU | 2197778 C2 | 1/2003 |
| RU | 2201033 C2 | 3/2003 |
| RU | 2207723 C1 | 6/2003 |
| RU | 2208913 | 7/2003 |
| RU | 2210866 C2 | 8/2003 |
| RU | 2216101 C2 | 11/2003 |
| RU | 2216103 C2 | 11/2003 |
| RU | 2216105 C2 | 11/2003 |
| RU | 2225080 C2 | 2/2004 |
| RU | 2235429 | 8/2004 |
| RU | 2235432 C2 | 8/2004 |
| RU | 2237379 C2 | 9/2004 |
| RU | 2238611 C1 | 10/2004 |
| RU | 2242091 C2 | 12/2004 |
| RU | 2003125268 | 2/2005 |
| RU | 2285388 | 3/2005 |
| RU | 2250564 | 4/2005 |
| RU | 2257008 | 7/2005 |
| RU | 2267224 | 12/2005 |
| RU | 2005129079 A | 2/2006 |
| RU | 2285338 | 10/2006 |
| RU | 2285351 C2 | 10/2006 |
| RU | 2335864 C2 | 10/2008 |
| RU | 2349043 C2 | 3/2009 |
| SU | 1320883 | 6/1987 |
| TW | 508960 | 11/2002 |
| TW | 510132 | 11/2002 |
| TW | 200302642 | 8/2003 |
| TW | 200401572 | 1/2004 |
| TW | I232040 | 5/2005 |
| TW | 248266 | 1/2006 |
| TW | 200718128 | 5/2007 |
| WO | 9408432 | 4/1994 |
| WO | WO9521494 | 8/1995 |
| WO | WO9613920 A1 | 5/1996 |
| WO | WO9701256 | 1/1997 |
| WO | WO9737456 A2 | 10/1997 |
| WO | WO9746033 A2 | 12/1997 |
| WO | WO9800946 | 1/1998 |
| WO | WO98014026 | 4/1998 |
| WO | 9837706 A2 | 8/1998 |
| WO | 9848581 A1 | 10/1998 |
| WO | WO9853561 | 11/1998 |
| WO | WO9854919 A2 | 12/1998 |
| WO | WO9941871 A1 | 8/1999 |
| WO | WO9944313 | 9/1999 |
| WO | WO9944383 A1 | 9/1999 |
| WO | 9953713 | 10/1999 |
| WO | WO9952250 A1 | 10/1999 |
| WO | WO9959265 | 11/1999 |
| WO | WO9960729 A1 | 11/1999 |
| WO | WO0002397 A2 | 1/2000 |
| WO | 0033503 | 6/2000 |
| WO | WO0070897 | 11/2000 |
| WO | 0101596 | 1/2001 |
| WO | 0117125 A1 | 3/2001 |
| WO | WO0126269 | 4/2001 |
| WO | WO0139523 A2 | 5/2001 |
| WO | 0145300 | 6/2001 |
| WO | WO0148969 A2 | 7/2001 |
| WO | WO0106010 | 8/2001 |
| WO | WO0158054 A1 | 8/2001 |
| WO | 0169814 A1 | 9/2001 |
| WO | WO0182543 A2 | 11/2001 |
| WO | WO0182544 A2 | 11/2001 |
| WO | WO0189112 A1 | 11/2001 |
| WO | WO0193505 | 12/2001 |

(56) References Cited

FOREIGN PATENT DOCUMENTS

| | | |
|---|---|---|
| WO | 0207375 | 1/2002 |
| WO | WO0204936 A1 | 1/2002 |
| WO | 0215616 | 2/2002 |
| WO | WO0219746 A1 | 3/2002 |
| WO | WO0231991 | 4/2002 |
| WO | WO0233848 A2 | 4/2002 |
| WO | 0245456 A1 | 6/2002 |
| WO | WO0249305 | 6/2002 |
| WO | WO0249306 | 6/2002 |
| WO | WO0249385 A2 | 6/2002 |
| WO | 02060138 | 8/2002 |
| WO | 02065675 | 8/2002 |
| WO | 02082689 A2 | 10/2002 |
| WO | WO02082743 A2 | 10/2002 |
| WO | 02089434 A1 | 11/2002 |
| WO | 02093819 A1 | 11/2002 |
| WO | WO02093782 A1 | 11/2002 |
| WO | WO02100027 A1 | 12/2002 |
| WO | WO03001696 A2 | 1/2003 |
| WO | WO03001761 A1 | 1/2003 |
| WO | WO03003617 | 1/2003 |
| WO | WO03019819 | 3/2003 |
| WO | 03034644 A1 | 4/2003 |
| WO | WO03030414 A1 | 4/2003 |
| WO | WO03043262 A1 | 5/2003 |
| WO | WO03043369 | 5/2003 |
| WO | WO03058871 A1 | 7/2003 |
| WO | 03069816 A2 | 8/2003 |
| WO | WO03067783 | 8/2003 |
| WO | WO03069832 A1 | 8/2003 |
| WO | 03075479 | 9/2003 |
| WO | WO03073646 | 9/2003 |
| WO | 03088538 A1 | 10/2003 |
| WO | WO03085876 | 10/2003 |
| WO | WO03094384 | 11/2003 |
| WO | WO03103331 | 12/2003 |
| WO | WO04002047 | 12/2003 |
| WO | 2004008671 | 1/2004 |
| WO | WO2004004370 | 1/2004 |
| WO | WO2004008681 A1 | 1/2004 |
| WO | WO2004015912 | 2/2004 |
| WO | WO2004016007 | 2/2004 |
| WO | 2004023834 A1 | 3/2004 |
| WO | WO2004021605 A1 | 3/2004 |
| WO | WO2004030238 A1 | 4/2004 |
| WO | WO2004032443 A1 | 4/2004 |
| WO | 2004040825 | 5/2004 |
| WO | WO2004038954 | 5/2004 |
| WO | WO2004038972 A1 | 5/2004 |
| WO | WO2004038988 | 5/2004 |
| WO | WO2004040690 A2 | 5/2004 |
| WO | WO2004040827 | 5/2004 |
| WO | WO2004047354 A1 | 6/2004 |
| WO | WO2004049618 A1 | 6/2004 |
| WO | WO2004051872 A2 | 6/2004 |
| WO | WO2004062255 A1 | 7/2004 |
| WO | WO2004064294 | 7/2004 |
| WO | WO2004064295 | 7/2004 |
| WO | 2004068721 A2 | 8/2004 |
| WO | WO2004066520 | 8/2004 |
| WO | WO2004073276 | 8/2004 |
| WO | 2004075023 | 9/2004 |
| WO | 2004077850 A2 | 9/2004 |
| WO | WO2004075442 | 9/2004 |
| WO | WO2004075448 | 9/2004 |
| WO | WO2004075468 | 9/2004 |
| WO | WO2004075596 | 9/2004 |
| WO | WO2004084509 | 9/2004 |
| WO | WO2004086706 A1 | 10/2004 |
| WO | WO2004086711 | 10/2004 |
| WO | 2004102816 A2 | 11/2004 |
| WO | WO2004095730 A1 | 11/2004 |
| WO | WO2004095851 | 11/2004 |
| WO | WO2004095854 | 11/2004 |
| WO | WO2004098072 A2 | 11/2004 |
| WO | WO2004098222 | 11/2004 |
| WO | WO2004102815 | 11/2004 |
| WO | 2004105272 A1 | 12/2004 |
| WO | 2004114549 | 12/2004 |
| WO | 2004114564 A1 | 12/2004 |
| WO | WO2005002253 A1 | 1/2005 |
| WO | 2005011163 A1 | 2/2005 |
| WO | 2005018270 | 2/2005 |
| WO | WO2005015795 A1 | 2/2005 |
| WO | WO2005015797 | 2/2005 |
| WO | WO2005015810 | 2/2005 |
| WO | WO2005015941 | 2/2005 |
| WO | 2005022811 A2 | 3/2005 |
| WO | 2005025110 A2 | 3/2005 |
| WO | WO2005020488 A1 | 3/2005 |
| WO | WO2005020490 | 3/2005 |
| WO | 2005032004 A1 | 4/2005 |
| WO | 2005004355 | 5/2005 |
| WO | WO2005046080 | 5/2005 |
| WO | 2005055484 A1 | 6/2005 |
| WO | 2005060192 A1 | 6/2005 |
| WO | WO2005055527 | 6/2005 |
| WO | WO2005065062 A2 | 7/2005 |
| WO | WO2005069538 A1 | 7/2005 |
| WO | WO2005074184 | 8/2005 |
| WO | WO2005096538 | 10/2005 |
| WO | WO2005122628 | 12/2005 |
| WO | 2006007292 A2 | 1/2006 |
| WO | 2006019710 | 2/2006 |
| WO | WO2006019710 A1 | 2/2006 |
| WO | WO2006026344 | 3/2006 |
| WO | WO2006044487 | 4/2006 |
| WO | 2006069300 | 6/2006 |
| WO | 2006069301 | 6/2006 |
| WO | WO2006069300 A2 | 6/2006 |
| WO | WO2006069397 | 6/2006 |
| WO | WO2006077696 | 7/2006 |
| WO | WO2006096784 A1 | 9/2006 |
| WO | WO2006099349 A1 | 9/2006 |
| WO | WO2006099545 A1 | 9/2006 |
| WO | WO2006099577 A1 | 9/2006 |
| WO | WO2006127544 A2 | 11/2006 |
| WO | WO2006134032 | 12/2006 |
| WO | WO2006138196 | 12/2006 |
| WO | WO2006138573 | 12/2006 |
| WO | WO2006138581 A2 | 12/2006 |
| WO | WO2007024934 | 3/2007 |
| WO | WO2007024935 | 3/2007 |
| WO | WO2007025160 | 3/2007 |
| WO | WO2007051159 | 5/2007 |

OTHER PUBLICATIONS

Blum et al., "On Optimum MIMO with antenna selection," IEEE International Conference on Communications: Conference Proceedings, vol. 1, Apr. 28, 2002, pp. 386-390.
H. Sampath et al. "A Fourth Generation MIMO-OFDM Broadband Wireless System: Design, Performance and Field Trial Results", IEEE Communications Magazine, pp. 143-149, Sep. 2002.
International Search Report—PCT/US06/023095—International Search Authority, European Patent Office—Oct. 10, 2006.
Written Opinion—PCT/US06/023095—International Search Authority, European Patent Office—Oct. 10, 2006.
International Preliminary Report on Patentability—PCT/US06/023095—The International Bureau of WIPO, Geneva. Switzerland—Dec. 17, 2007.
Catreux S et al: "Simulation Results for an Interference-Limited Multiple Input Multiple Output Cellular System" pp. 1094-1096; Globecom'00. 2000 IEEE Global Telecommunications Conference. San Francisco, CA, Nov. 27-Dec. 1, 2000.
Kousa M A et al: "Adaptive Binary Coding for Diversity Communication Systems" IEEE International Conference on Personal Wireless Communications Proceedings, pp. 80-84, XP000992269, 1997.
Prasad N. et al.: "Analysis of Decision Feedback Detection for MIMO Rayleigh Fading Channels and Optimum Allocation of Transmitter Powers and QAM Constellations," pp. 1-10, 39th Annual Conference on Comm. Control and Comput., Monticello, IL Oct. 2001.

(56) References Cited

OTHER PUBLICATIONS

Seong Taek Chung et al: "Low complexity algorithm for rate and power quantization in extended V-BLAST" VTC Fall 2001. IEEE 54th. Vehicular Technology Conference Proceedings. Atlantic City, NJ, Oct. 7-11, 2001, vol. 1 of 4, pp. 910-914, Conf. 54.
Gamal, et al., "Universal Space-Time Coding, " IEEE Transactions on Information Theory, vol. 49, No. 5, May 2003, pp. 1097-1116.
Qualcomm Europe, Description and link simulations of MIMO schemes for OFDMA based E-UTRA downlink evaluation, 3GPP TSG-RAN WG1 #42 R1-050903, 3GPP, Sep. 2, 2005.
T. Suzuki, Rank prediction method in consideration of transmission diversity in a MIMO system, Technical study report of the Institute of Electronics, Information and Communication Engineers, Feb. 27, 2008, vol. 107, No. 518, pp. 281-286, RCS2007-2.
Wiesel A et al.: "Efficient implementation of sphere demodulation" Signal Processing Advances in Wireless Communications, 2003. SPAWC 2003. 4th IEEE Workshop on Rome, Italy Jun. 15-18, 200 3, Piscataway, NJ, USA, IEEE, US, Jun. 15, 2003. pp. 36-40, XP010713463.
"European Search Report—EP10011743, Search Authority—Munich Patent Office, Dec. 20, 2010".
European Search Report—EP10012081, Search Authority—Munich Patent Office, Dec. 17, 2010.
European Search Report—EP10012082, Search Authority—Munich Patent Office, Dec. 20, 2010.
European Search Report—EP10012083, Search Authority—Munich Patent Office, Dec. 30, 2010.
Groe, J. et al.: "CDMA Mobile Radio Design," Sep. 26, 2001, Artech House, Inc. Norwood, MA, pp. 257-259.
Sumii, Kenji et al.: "A Study on Computational Complexity Reduction of Iterative Decoding for Turbo-coded MIMO-SDM Using Sphere Decoding," Technical Report of IEICE. RCS, Nov. 9, 2010, vol. 104, No. 675, pp. 43-48.
Taiwanese Search Report—095139893—TIPO—Dec. 30, 2010.
Translation of Office Action in Chinese Application 2006800295980 corresponding to U.S. Appl. No. 11/260,895, citing CN1346221 and CN1383631 dated Feb. 16, 2011.
Translation of Office Action in Korean application 10-2007-7031029 corresponding to U.S Appl. No. 11/260,931, citing US20030202491 and KR20040063057 dated Jan. 28, 2011.
Translation of Office Action in Japanese Application 2008-514880 corresponding to U.S. Appl. No. 11/445,377, citing JP2007519281 and JP2006505172 dated Nov. 19, 2010.
Translation of Office Action in Japanese Application 2008-529216 corresponding to U.S. Appl. No. 11/261,159, citing GB2348776, WO2004098222, WO2005065062 and WO2004102815. Dated Jan. 11, 2011.
Yongmei Dal,; Sumei Sun; Zhongding Lei; Yuan Li.: "A List Sphere Decoder based turbo receiver for group wise space time trellis coded (GSTTC) systems," 2004 IEEE 59th Vehicular Technology Conference, vol. 2, pp. 804-808, May 17, 2004, doi: 10.1109/VETECS. 2004.1388940.
Hochwald et al., "Achieving near-capacity on a multiple-antenna channel," IEEE Transactions on Communications, IEEE Service Center, Piscataway, New Jersey, vol. 51, No. 3, pp. 389-399 (2003).
Widdup et al., "A highly-parallel VLSI architecture for a list sphere detector," IEEE International Conference, Paris, France, vol. 5, pp. 2720-2725 (2004).
Guo, K. et al.: "Providing end-to-end QoS for multimedia applications in 3G wireless networks," Proceedings vol. 5242, SPIE ITCom 2003 Conf. Internet Multimedia Management Systems IV, Nov. 26, 2003, pp. 1-14, DOI: 10.1117/12.514061.
Translation of Office Action in Japan application 2008-538193 corresponding to U.S. Appl. No. 11/261,065, citing JP11196109, JP10322304 and JP09008725 dated Mar. 8, 2011.
Translation of Office Action in Canadian application 2625987 corresponding to U.S. Appl. No. 11/261,065, citing CA2557369 dated Apr. 12, 2011.

Translation of Office Action in Chinese application 200680040236.1 corresponding to U.S. Appl. No. 11/261,065, citing US20040048609 and CN1402916 dated Feb. 18, 2011.
Translation of Office Action in Chinese application 200680048265.2 corresponding to U.S. Appl. No. 11/260,931, citing US6904097, WO2004095851, CN1344451 dated Jan. 26, 2011.
Translation of Office Action in Chinese application 200680048832.4 corresponding to U.S. Appl. No. 11/261,158, citing CN1132474 dated Dec. 31, 2010.
Translation of Office Action in Japanese application 2008-528103 corresponding to U.S. Appl. No. 11/260,924, citing JP2005502218, JP2004534456, JP2003348047, JP2003199173, JP2004529524, JP11508417, JP2001238269, JP2005130491 and JP2003500909 dated Feb. 8, 2011.
Translation of Office Action in Japanese application 2008-538181 corresponding to U.S. Appl. No. 11/511,735, citing WO04064295, JP2002515203, JP8288927, JP7336323 and JP200157545 dated Jan. 25, 2011.
Voltz, P. J.,"Characterization of the optimum transmitter correlation matrix for MIMO with antenna subset selection", IEEE Transactions on Communications, vol. 51, No. 11, pp. 1779-1782, (Nov. 1, 2003).
Alcatel-Lucent, et al., "Dedicated Reference Signals for Precoding in E-UTRA Downlink" 3GPP Draft; R1-071718, 3RD Generation Partnership Project (3GPP), Mobile Competence Centre; 650, Route Des Lucioles; F-06921 Sophia-Antipolis Cedex; France, vol. RAN WG1, No. St. Julian; Apr. 3, 2007, XP050105640 [retrieved on Apr. 3, 2007].
Anonymous: "3GPP TS 36.211 V8.0.0; Evolved Universal Terrestrial Radio Access (E-UTRA); Physical channels and modulation (Release 8)" 3rd Generation Partnership Project; Technical Specification Group Radio Access Network, [Online] 2007, XP002520076 Retrieved from the Internet: URL:http://www.Sgpp.org/ftp/Specs/html-i nf o/36211.htm> [retrieved on Sep. 27, 2007] Section 5.
Bengtsson, M. et at, "A Generalization of Weighted Subspace Fitting to Full-Rank Models", IEEE Transactions on Signal Processing, IEEE Service Center, New York, NY, US, vol. 49, No. 5, pp. 1002-1012, May 1, 2001.
Dammann, A. et al., "Beamforming in Combination with Space-Time Diversity for Broadband OFDM Systems", ICC 2002. 2002 IEEE International Conference on Communications. Apr. 28-May 2, 2002, pp. 165-171, XP010589479.
Jim Tomcik, QFDD and QTDD: Technology Overview, IEEE 802.20 Working Group on Mobile Broadband Wireless Access, October 28, 2005, pp. 48-50, URL, HTTP://www.IEEE802.Org/20/Contribs/C802.20-05-68.Zip.
Ken Murakami et al., "Status Toward Standardization at IEEE 802. 3ah and items on the construction of GE-PON system ," Technical Report of the Institute of Electronics, Information and Communication Engineers, Jun. 13, 2003, vol. 103, No. 124, pp. 1-6, IN2003-24.
Miorandi D., et al., "Analysis of master-slave protocols for real-time industrial communications over IEEE 802.11 WLANs" Industrial Informatics, 2004. INDIN '04, 2nd IEEE International Conference on Berlin, Germany Jun. 24-26, 2004. Piscataway, NJ, USA IEEE, June. 24, 2004, pp. 143-148, XP010782619, ISBN 0789385136, Para 3, point B.
Nokia: "Compact signalling of multi-code allocation for HSDPA", version 2, 3GPP R1-02-0018, Jan. 11, 2002.
Physical Channels and Multiplexing in Evolved UTRA Downlink TSG-RAN Working Group 1 Meeting, XX, XX, vol. RI-050590, Jun. 20, 2005, pp. 1-24, XP003006923 the whole document.
Sethi M, et al., "Code Reuse DS-CDMA-A Space Time Approach", Proceedings of the 2002 IEEE International Conference on Acoustics, Speech, and Signal Processing (ICASSP), pp: 2297-2300, May 13-17, 2002.
Siemens, "Evolved UTRA uplink scheduling and frequency reuse" [online], 3GPP TSG-RAN WG1 # 41 R1-050476, Internet <URL:http://www.3gpp.org/ftp/tsg_ran/WG1_RL1/TSGR1_41/Docs/R1-050476.zip>, May 9, 2005.
Sklar, B., "The process of thus correcting the channel-induced distortion is called equalization", Digital Communications, PTR Prentice Hall, Upper Saddle River, New Jersey, 1998, Formatting and Baseband Transmission, Chap. 2, Section 2.11.2, pp. 54, 104-106.

(56) References Cited

OTHER PUBLICATIONS

Viswanath, P. et al, "Opportunistic Beamforming Using Dumb Antennas" IEEE Transactions on Information Theory, IEEE USA, vol. 48, No. 6, Jun. 2002, pp. 1277-1294, XP002314708 ISSN: 0018-9448 abstract right-hand column, paragraph 1.

Yatawatta, S. et al., "Energy Efficient Channel Estimation in MIMO Systems", 2005 IEEE International Conference on Acoustics, Speech, and Signal Processing, Mar. 18-23, 2005, Philadelphia, vol. 4, pp. 317-320, Mar. 18, 2005.

Bhushan N., "UHDR Overview", C30-20060522-037, Denver, CO, May 22, 2006, pp. 1-115.

Samsung: "Uplink Transmission and Multiplexing for EUTRA", 3GPP Draft; R1-050605 UL Multiplexing, Jun. 16, 2005, XP050111420.

Tachikawa (Editor); "W-CDMA Mobile Communication Systems," John Wiley & Sons Ltd., Japan, Maruzen: pp. 82-213, Jun. 25, 2001.

3GPP TS 33.220 V.1.1.0 XX,XX, "3rd Generation Partnership Project; Technical Specification Group Services and System Aspects; Generic Authentication Architecture (GAA); Generic Bootstrapping Architecture (Release 6)" Feb. 9, 2004, pp. 1-17, figure 4, XP002996023.

3rd Generation Partnership Project; Technical Specification Group Radio Access Network Physical Layer Aspects for Evolved UTRA (Release 7), 3GPP TR 25,814 v0.3.1 (Nov. 2005).

B. Sklar: "The process of thus correcting the channel-induced distortion is called equalization", Digital Communications, PTR Prentice Hall, Upper Saddle River, New Jersey, 1998, Formatting and Baseband Transmission, Chap. 2, Section 2,11.2, pp. 104-106.

Bahai Saltzberg: "System Architecture," Multi-Carrier Digital Communications, Kluwer Academic New York, NY, XP-002199501, 1999, pp. 17-21.

Bingham: "Other Types of MCM," ADSL VDSL, and Multicarrier Modulation, John Wiley & Sons, New York, XP-002199502, 2000, pp. 111-113.

Chennakeshu, et al. "Capacity Analysis of a TDMA-Based Slow-Frequency-Hopped Cellular System, "IEEE Transcation on vehicular Technology, vol. 45, No. 3 Aug. 1996, pp. 531-542.

Chiani, et al. "Outage Evaluation for Slow Frequency-Hopping Mobile Radio Systems" IEEE Transactions on Communications, vol.47, No. 12, Dec. 1999, pp. 1865-1874.

Choi, et al., "Design of the Optimum Pilot Pattern for Channel Estimation in OFDM Systems, " Global Telecommunications Conference, IEEE Communications Society, Globecom, Dallas, TX (2004), pp. 3661-3665.

Czylwik; "Comparison Between Adaptive OFDM and Single Carrier Modulation with Frequency Domain Equalization, " IEEE 47th Vehicular Technology Conference, vol. 2, May 4-7, 1997, pp. 865-869.

Das, Arnab, et al. "Adaptive, asynchronous incremental redundancy (A-IR) with fixed transmission time intervals TTI for HSDPA, " IEEE, Personal, Indoor and Mobile Radio Communications, 2002. The 13th IEEE International Symposium on, pp. 1083-1087.

Das et al., "On the Reverse Link Interference Structure for Next Generation Cellular Systems, " Global Telecommunications Conference, 2004. Globecom '04, IEEE, vol. 5 IEEE Nov. 29-Dec. 3, 2004, pages 3068-3072.

Dierks, et al., "The TLS Protocol", Version 1.0, Network Working Group, Request for Comments 2246, pp. 1-80 (Jan. 1990).

Digital cellular telecommunications systems (Phase 2+); Mobile radio interface layer 3 specification (GSM 04.08 version 7.7.1 Release 1998); ETSI EN 300 940 V7.7.1 (Oct. 2000), pp. 1,2,91-93.

Dinis R; Falconer D; Tong Lam C; Sabbaghian M; "A Multiple Access Scheme for the uplink of Broadband wireless systems" Global Telecommunications Conference, 2004. Globecom '04. IEEE Dallas, TX, USA Nov. 29-Dec. 3, 2004, vol. 6, pp. 3808-3812, XP010758449 Piscataway, NJ, USA, IEEE.

Don Torrieri, "Cellular Frequency-Hopping CDMA Systmes," IEEE Vehicular Technology Conference, May 16, 1999, pp. 919-925, vol. 2.

Favre et al; "Self-Adaptive Transmission Procedure" IBM Technical Disclosure Bulletin, IBM Corporation, Sep. 1976, vol. 19, No. 4, pp. 1283-1284, New York, New York.

Fuchs, et al., "A Novel Tree-Based Scheduling Algorithm for the for the Downlink of Multi-User MIMO SYstems with ZF Beamforming, "IEEE International Conference on Acoustics, Speech, and Signal Processing, Philadelphia, pp. 1121-1124, Mar. 18-23 (2005).

Hermann Rohling et al., "Performance Comparison of Different Multiple Access Schemes for the Downlink of an OFDM Communication System", Vehicular Technology Conference, 1997, 47th IEEE, vol. 3, May 3-7, 1997, pp. 1365-1369.

Hill, et al., "Cyclic Shifting and Time Inversion of Partial Transmit Sequences to Reduce the Peak-to-Average Power Ratio in OFDM, " IEEE International Symposium on Personal Indoor and Mobile Radio Communications, vol. 2, Sep. 18, 2000, Piscataway, NJ, pp. 1256-1259.

Hui Won Je et al, "A Novel Multiple Access Scheme for Uplink Cellular Systems, " Vehicular Technology Conference, 2004, VTC2004-fall, 2004 IEEE 60th Los Angeles, CA, US, Sep. 26-29, 2004, Piscataway, NY, pp. 984-988.

John B. Groe, Lawrence E. Larson, "CDMA Mobile Radio Design" Sep. 26, 2001, Artech House, Norwood, MA02062 580530, XP002397967, pp. 157-159.

J.S. Chow and J.M. Cioffi: "A cost-effective maximum likelihood reciever for multicarrier systems", Proc. IEEE Int. Conf. On Comm., pp. 948-952, Jun. 1992.

Kaleh: "Channel Equalization for Block Transmission Systems, " IEEE Journal on Selected Areas in Communications, vol. 13, No. 1, Jan. 1995, pp. 110-121.

Kappes, J.M., and Sayegh, S.I., "Programmable Demultiplexer/Demodulator Processor, " COMSAT Laboratories, IEEE, Mar. 11, 1990, pp. 230-234.

Karsten Bruninghaus et al.,: "Multi-CarrierSpread Spectrum and It's Relationship to Single-Carrier Transmission", Vehicular technology Conference, 1998, VTC 98, 48th IEEE, vol. 3, May 18-21, 1998, pp. 2329-2332.

Keller, et al.: "Adaptive Multicarrier Modulation: A Convenient Framework for Time-Frequency Processing in Wireless Communications, " Proceedings of the IEEE, vol. 88, No. 5, May 2000, pp. 611-640.

Kim, et al. "Performance of TDMA System with SFH and 2-Nit Differentially Detected GMSK over Rayleigh Fading Channel, " IEEE Vehicular Technology Conference, Apr. 28, 1996, pp. 789-793.

Kishiyama et al., Investigation of Optimum pilot channel Structure for VSF-OFCDM broadband wireless access in forward link, VTC 2003-Spring, The 57th IEEE Semiannual Vehicular Technology Conference, PRoceedings JEJU, Korea Apr. 22-25, 2003, pp. 139-144.

Kostic, et al., "Dynamic Frequency Hopping in Wireless Cellular Systems-Simulations of Full-Replacement and Reduced-Overhead Methods, " IEEE Vehicular Technology Conference, May 16, 1999, pp. 914-918.

Kostic, et al. "Fundamentals of Dynamic Frequency Hopping in Cellular Systems, " IEEE Journal on Selected Areas in Communications, vol. 19, No. 11, Nov. 2001, pp. 2254-2266.

Lacroix, et al.; "A Study of OFDM Parameters for High Data Rate Radio LAN's, " 2000 IEEE 51st Vehicular Technology Conference Proceedings, vol. 2, May 15-18, 2000, pp. 1075-1079.

Laroia, R. et al: "An integrated approach based on cross-layer optimization—Designing a mobile broadband wireless access netwwork" IEEE Singal Processing Magazine, IEEE Service Center, Piscataway, NJ, US vol. 21, No. 5, Sep. 2004, pp. 20-28, XP011118149.

Lau, et al., "On the Design of MIMO Block Fading Channels with Feedback-Link Capacity Constraint, " IEEE Transactions on Communications, IEEE Service Center, Piscataway, NJ, US, vol. 52, No. 1, Jan. 2004, pp. 62-70, XP001189908.

Leon, et al., "Cyclic Delay Diversity for Single Carrier-Cyclic Prefix Systems, " COnference Record of the Thirty-Ninth Asilomar Conference on Singals, Systems and Computers, Oct. 28, 2005, Piscataway, NJ, pp. 519-523.

Lettieri et al: "Adaptive frame length control for improving wireless link troughput, range, and energy efficiency", INFOCOM 98, 17th Annual Joint Conference of the IEEE Computer and Communica-

(56) References Cited

OTHER PUBLICATIONS tions Societies, Mar. 29-Apr. 1, 1998, pp. 564-571, vol. 2, IEEE San Francisco, CA, New York, New York.

Lott: "Comparison of Frequency and Time Domain Differential Modulation iin an OFDM System for Wireless ATM," 1999 ieee 49th Vehicular Technology Conference, vol. 2, Jul. 1999, pp. 877-883.

Maniatis, I. et al., "Pilot for joint channel estimation in multi-user OFDM mobile radio systems," Spread Spectrum Techniques and Applications, 2002 IEEE Seventh International Synposium, Sep. 2, 2002, pp. 44-48, XP010615562.

Mignone, et al.: "CD3-OFDM: A New Channel Estimation Method to Improve the Spectrum Efficiency in Digital Terrestrial Television Systems," International Broadcasting Convention, Sep. 14-18, 1995 Conference Publication No. 413, IEE 1995, pp. 122-128.

Molisch, et al., MIMO systems with antenna selection, IEEE Microwave Magazine, Mar. 2004, pp. 46-56, XP002411128.

Naofal Al-Dhahir: "A Bandwidth-Optimized Reduced-Complexity Equalized Multicarrier Transceiver", IEEE Transcactions on Communication, vol. 45, No. 8, Aug. 1997.

Naofal Al-Dhahir: "Optimum Finite-Length Equalization for Multicarrier Transceivers", IEEE Trans. on Comm., pp. 56-64, Jan. 1996.

Nassar et al., "Introduction of Carrier Interference to Spread Spectrum Multiple Access, " Wireless Communications and Systems, 1999 Emerging Technologies Symposium, IEEE, Apr. 12-13, 1999, pp. 1-5.

Natarajan, et al., "High-Performance MC-CDMA via Carrier Interferometry Codes, " IEEE Transaction on Vehicular Technology, 2001, vol. 50 (issue 6).

Nokia, "Uplink Considerations for UTRA LTE", 3GPP TSG RAN WG1#40bis, Beijing, CN, R1-050251, 3GPP, Apr. 4, 2005, pp. 1-9.

NTT DoCoMo, "Downlink Multiple Access Scheme for Evolved UTRA", 3GPP R1-050249, 3GPP, Apr. 4, 2005, pp. 1-8.

NTT DoCoMo, et al., "Orthogonal Common Pilot Channel and Scrambling Code in Evolved UTRA Downlink, " 3GPP TSG RAN WG1 #42 on LTE (Original R1-050589), R1-050704, London UK, pp. 1-8, Aug. 29-Sep. 2, 2005.

Qualcomm Europe: "Description and link simulations for OFDMA based E-UTRA oplink" 3GPP Draft; R1-051100, 3rd Generation Partnership Project (3GPP), Mobile Competence Centre; Sophia-Antipolis Cedex, France, vol. RAN WG1, no. San Diego, USA; Oct. 4, 2005, pp. 1-10, XP050100715.

S. Nishimura et al., "Downlink Nullforming by a Receiving Antenna Selection for a MIMO/SDMA Channel", Technical Search Report of Electric Information Communication Academic Conference, Feb. 28, 2002, vol. 101, No. 683, pp. 17-22, RCS 2001-286.

Sandeep Chennakeshu et al., "A comparison of diversity schemes for a mixed-mode slow Frequency-hopped cellular system, "Global Telecommunications Conference, 1993, including a Communications Theory Mini-Conference. Technical Program Conference Record, IEEE in Houston. Globecom ''93., IEEE, Nov. 29, 1993, pp. 1749-1753, vol 3.

Sari, et al., "Transmission Techniques for Digital Terrestrial TV Broadcasting, " IEEE Communications Magazine, Feb. 1995, pp. 100-109.

Schnell et al., "Application of IFDMA to Mobile Radio Transmission", IEEE 1998 International Conference on Universal Personal Communications, vol. 2, Oct. 5-9, 1998, pp. 1267-1272.

Schnell et al., "A Promising New Wideband Multiple-Access Scheme for Future Mobile Communications Systems" European Transaction on Telecommunications, vol. 10, No. 4, Jul. 1999, pp. 417-427.

Shattil et al., "Array Control Systems for Multicarrier Protocols Using a Frequency-Shifted Feedback Cavity", Radio and Wireless Conference EEE, Aug. 1-4, 1999, pp. 215-218.

Sorger U., et al., "Interleaved FDMA-A New Spread-Spectrum Multiple Access Scheme, CP010284733," Communications, Conference Record, IEEE, Atlanta, GA, 1998, 1013-1017.

Telecommunications Industry Association, "Mobile Station-Based Station Compatibility Standard for Dual-Moide Wideband Spread Spectrum Cellular System," TIA/EIA-95, Jul. 1993.

Tellado, "Multicarrier Modulation with Low Par," Kluwer Academic, Dordrecht, NL, XP-0021995500, 2000, pp. 6-11 and 55-60.

Tellambura, "Use of m-sequences for OFDM Peak-to-Average Ratio Reduction," Electronic Letters, vol. 33, No. 15, Jul. 17, 1997, pp. 1300-1301.

TIA/EIA/IS-2000 Standards for CDMA2000 Spread Spectrum Systems 3GPP2 C.S0001-0 Version 1.0, Jul. 1999.

TIA—1121.001 "Physical Layer for Ultra Mobile Broadband (UMB) Air Interface Specification," 3GPP2 C.S0084-001-0, Version 2.0 (Aug. 2007).

TIA—1121.002 "Medium Access Control Layer for Ultra Mobile Broadband (UMB) Air Interface Specification, " 3GPP2 C.S0084-002-0. Version 2.0 (Aug. 2007).

Tomcik J, "MBFDD and MBTDD Wideband Mode: Technology Overview", IEEE 802.20 Working Group Mobile Broadband Wireless Access, Jan. 6, 2006, 1-109.

Tomcik, Jim: "QFDD Technology Overview Presentation, " IEEE 802.20 Working Group on Mobile Broadband Wireless Access, [Online] Nov. 15, 2005, pp. 1-73, XP002467626.

Tomcik, T.: "QTDD Performance Report 2", IEEE C802.20-05/88, IEEE 802.20 Working Group on Mobile Broadband Wireless Access, http://ieee802.org/20/, pp.1-56, XP002386798 (Nov. 15, 2005).

Toufik, I. et al., Channel allocation algorithms or multi-carrier systems, Vehicular Technology Conference 2004, VTC2004-FALL, 2004 IEEE 60th Los Angeles, CA, USA Sep. 26-29, 2004, Piscataway, NJ, USA IEEE, Sep. 26, 2004, pp. 1129-1133, XP010786798.

Wang et al., "Improving performance of multi-user OFDM systems using bit-wise interleaver" Electronics Letters IEE Stevenage, GB, vol. 37, No. 19, Sep. 13, 2001, pp. 1173-1174 XP006017222.

Xiaodong, et al., "M-Sequences for OFDM Peak-to-Average Power Ratio Reduction and Error Correction, " Electronics Letters, vol. 33, Issue 7, Mar. 27, 1997, pp. 554-555.

Yun et al., "Performance Of and LDPC-Coded Frequency-Hopping QFDMA System Based on Resource Allocation in the Uplink" Vehicular Technology-Conference 2004. VTO 2004-Spring, 2004 IEEE 59th Milan, Italy May 17-19, 2004, Piscataway, NJ, USA, vol. 4, May 17, 2004, pp. 1925-1928, XP010766497.

Zekri, et al., "DMT Signals with Low Peak-to-Average Power Ratio, " Proceedings, IEEE International Symposium on Computers and Communications, 1999, Jul. 6-8, 1999, pp. 362-368.

LG Electronics: "PAPR comparison of uplink MA schemes", 3GPP TSG RAN WG1 Meeting #41, R1-050475, May, 9-13, 2005, pp. 6.

Motorola, "Uplink Numerology and Frame Structure", 3GPP TAG RAN1 #41 Meeting R1-050397, May 13, 2005.

Samsung Electonics Co. Ltd.; "Uplink Multiple Access and Multiplexing for Evolved UTRA", R1-050439, May 3, 2005, pp. 1-22, XP55018616, Retrieved from the Internet: URL:http://www.3gpp.org/ftp/tsg_ran/WG1_R1/TSGR1/Docs/ [retrieved on Feb. 7, 2012].

* cited by examiner

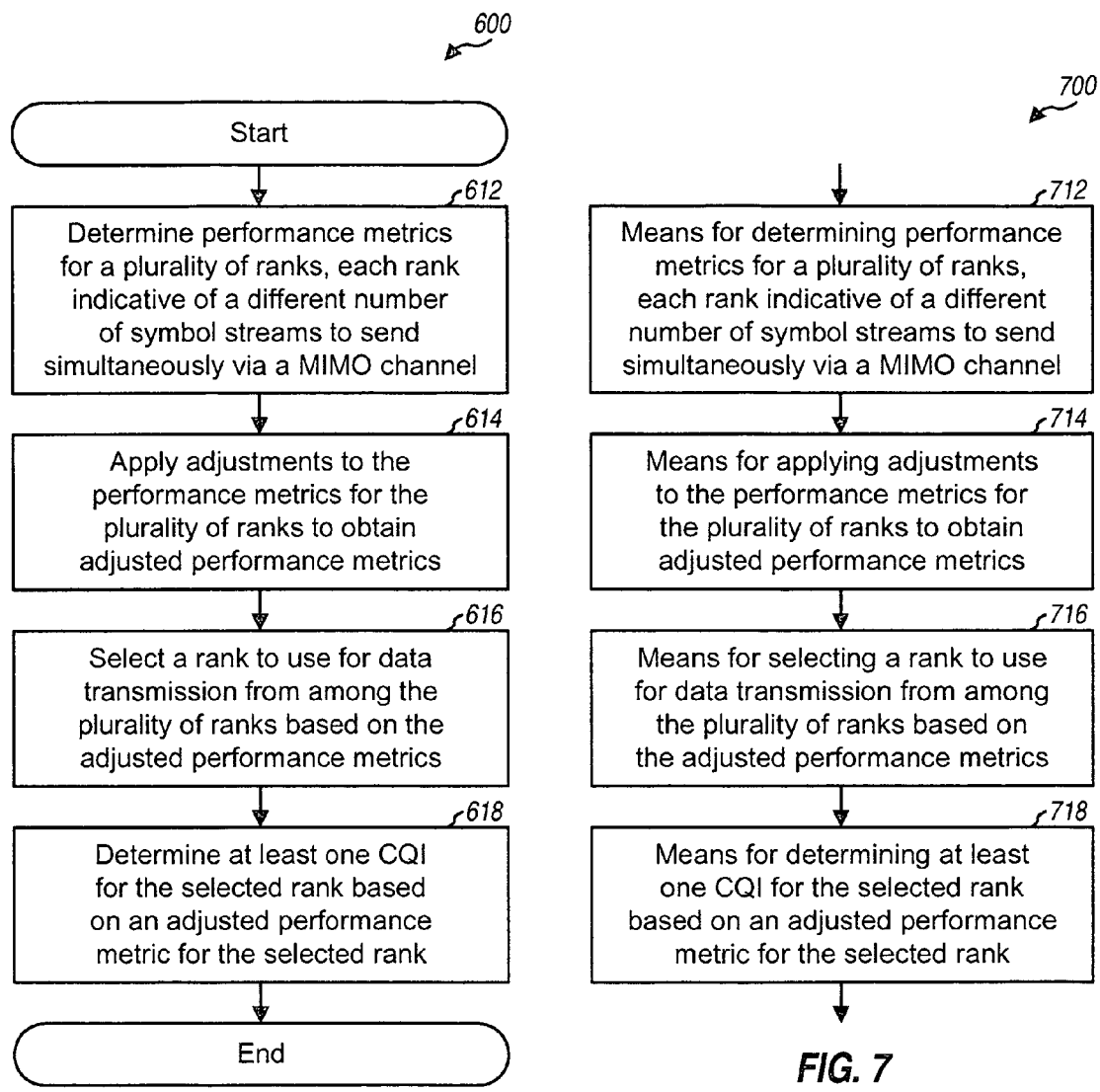

ROBUST RANK PREDICTION FOR A MIMO SYSTEM

CLAIM OF PRIORITY UNDER 35 U.S.C. §119

The present application claims priority to provisional U.S. Application Ser. No. 60/691,723, entitled "ROBUST RANK PREDICTION FOR INTERFERENCE, POWER CONTROL, CHANNEL ESTIMATION, PACKET FORMATS AND ADMISSION CONTROL," filed Jun. 16, 2005, assigned to the assignee hereof and incorporated herein by reference.

BACKGROUND

I. Field

The present disclosure relates generally to communication, and more specifically to techniques for transmitting data in a multiple-input multiple-output (MIMO) system.

II. Background

In a wireless communication system, a transmitter (e.g., a base station or a terminal) may utilize multiple (T) transmit antennas for data transmission to a receiver equipped with multiple (R) receive antennas. The multiple transmit and receive antennas form a MIMO channel that may be used to increase throughput and/or improve reliability. For example, the transmitter may transmit T data streams simultaneously from the T transmit antennas to improve throughput. Alternatively, the transmitter may transmit a single data stream redundantly from all T transmit antennas to improve reception by the receiver.

The transmission from each transmit antenna causes interference to the transmissions from the other transmit antennas. In some instances, improved performance may be achieved by transmitting fewer than T data streams simultaneously from the T transmit antennas. For example, a subset of the T transmit antennas may be selected, and a data stream may be sent from each selected transmit antenna. The transmit antenna(s) that are not used for transmission do not cause interference to the transmit antenna(s) that are used for transmission. Hence, improved performance may be achieved for the data stream(s) sent on the selected transmit antenna(s).

Rank prediction refers to the determination of the rank of a MIMO channel or, equivalently, the number of data streams that can be transmitted simultaneously via the MIMO channel. If too many data streams are sent, then excessive interference may be observed by each of these data streams and the overall performance may suffer. Conversely, if too few data streams are sent, then the capacity of the MIMO channel is not fully utilized.

There is therefore a need in the art for techniques to determine the rank of a MIMO channel.

SUMMARY

Techniques for performing rank prediction in a MIMO system are described herein. In an embodiment, rank prediction is achieved by evaluating the performance of different possible ranks of a MIMO channel and selecting the rank with the best or near best performance. In an embodiment, the rank prediction accounts for system losses, which may include any type of loss that may be observed by data transmission.

In an embodiment of rank prediction, performance metrics for a plurality of ranks are initially determined. Each rank is indicative of a different number of data streams to send simultaneously via a MIMO channel. The performance metrics may relate to the capacity of the MIMO channel, the throughput of data transmission sent via the MIMO channel, signal quality of the MIMO channel, and so on. Adjustments are applied to the performance metrics for the plurality of ranks to obtain adjusted performance metrics for these ranks. The adjustments account for system losses such as losses due to an error correction code used for data transmission, channel estimation errors at a receiver, variation in interference observed by the receiver, variability in transmit power due to power control, and/or other factors. A rank is then selected based on the adjusted performance metrics for the plurality of ranks. The rank with the best adjusted performance metric may be selected. Alternatively, the lowest rank with an adjusted performance metric that is within a predetermined percentage of the best adjusted performance metric may be selected. At least one channel quality indicator (CQI) for the selected rank is determined based on the adjusted performance metric for the selected rank. The selected rank and CQI(s) may be quantized and sent to a transmitter.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 6 shows a process for performing rank prediction.

FIG. 7 shows an apparatus for performing rank prediction.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
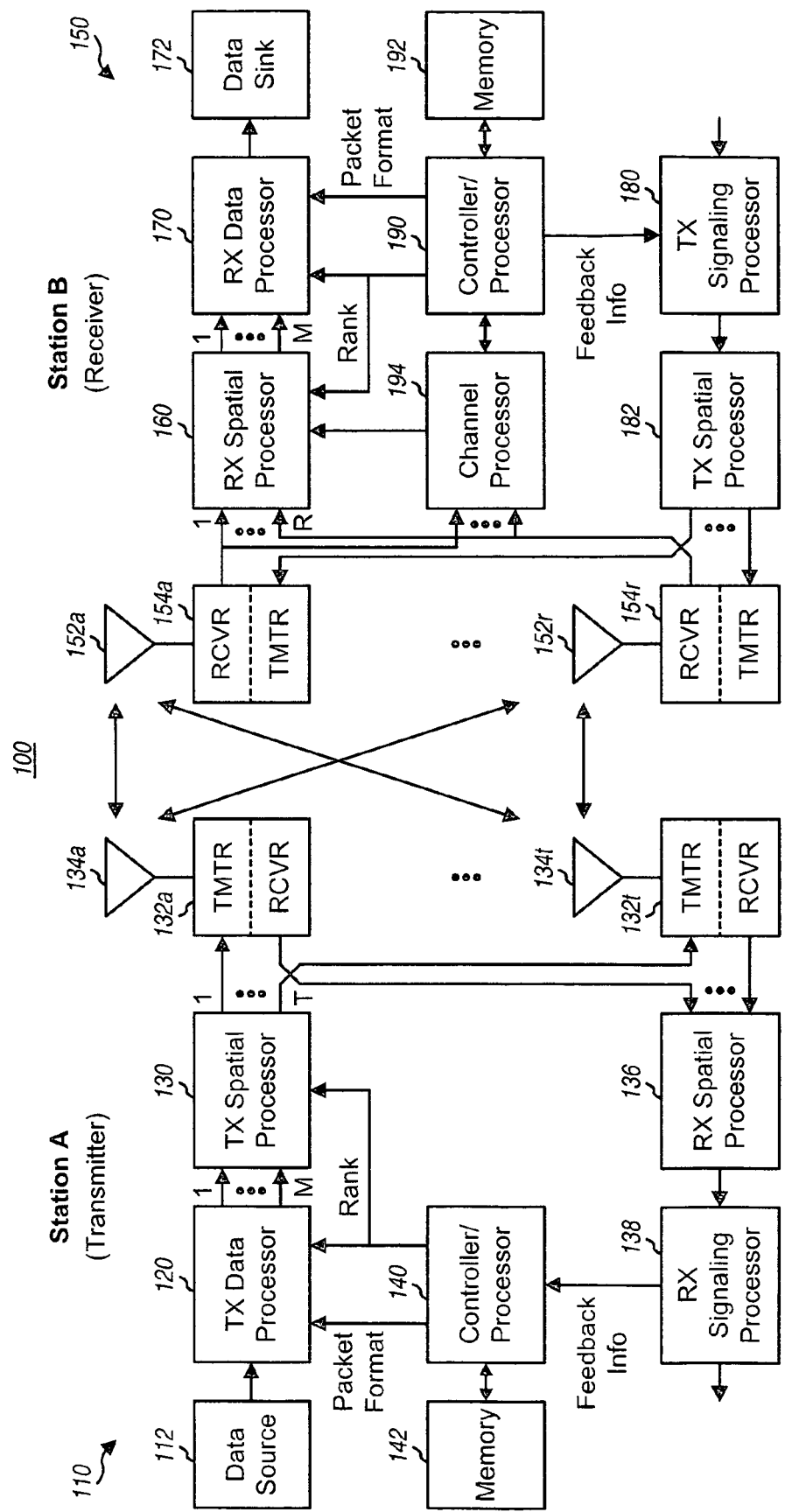
FIG. 1 shows a transmitter station and a receiver station.

FIG. 1 shows a block diagram of an embodiment of two stations 110 and 150 in a wireless communication system 100. For downlink (or forward link) transmission, station 110 may be part of, and may contain some or all of the functionality of, a base station, an access point, a Node B, and/or some other network entity. Station 150 may be part of, and may contain some or all of the functionality of, a terminal, a mobile station, a user equipment, a subscriber unit, and/or some other device. For uplink (or reverse link) transmission, station 110 may be part of a terminal, a mobile station, a user equipment, and so on, and station 150 may be part of a base station, an access point, a Node B, and so on. Station 110 is a transmitter of a data transmission and is equipped with multiple (T) antennas. Station 150 is a receiver of the data transmission and is equipped with multiple (R) antennas. Each transmit antenna and each receive antenna may be a physical antenna or an antenna array.

At transmitter station 110, a transmit (TX) data processor 120 receives traffic data from a data source 112, processes (e.g., formats, encodes, interleaves, and symbol maps) the traffic data in accordance with a packet format, and generates data symbols. As used herein, a data symbol is a symbol for data, a pilot symbol is a symbol for pilot, and a symbol is typically a complex value. The data symbols and pilot symbols may be modulation symbols from a modulation scheme such as PSK or QAM. Pilot is data that is known a priori by both the transmitter and receiver. A packet format may indicate a data rate or information bit rate, a coding scheme or code rate, a modulation scheme, a packet size, and/or other parameters. A packet format may also be referred to as a rate, a transport format, or some other terminology. TX data processor 120 demultiplexes the data symbols into M streams, where 1≤M≤T and is determined by the rank provided by a controller/processor 140. The data symbol streams are sent simultaneously via a MIMO channel and may also be referred to as data streams, spatial streams, output streams, or some other terminology.

A TX spatial processor 130 multiplexes pilot symbols with the M data symbol streams, performs transmitter spatial processing on the multiplexed data and pilot symbols, and provides T streams of output symbols to T transmitters (TMTR) 132a through 132t. Each transmitter 132 processes (e.g., modulates, converts to analog, filters, amplifies, and upconverts) its output symbol stream and generates a modulated signal. T modulated signals from transmitters 132a through 132t are transmitted from antennas 134a through 134t, respectively.

At receiver station 150, R antennas 152a through 152r receive the T modulated signals, and each antenna 152 provides a received signal to a respective receiver (RCVR) 154. Each receiver 154 processes (e.g., filters, amplifies, downconverts, digitizes, and demodulates) its received signal to obtain received symbols. Each receiver 154 provides received symbols for traffic data to a receive (RX) spatial processor 160 and provides received symbols for pilot to a channel processor 194. Channel processor 194 estimates the response of the MIMO channel from station 110 to station 150 based on the received symbols for pilot (and possibly the received symbols for traffic data) and provides channel estimates to RX spatial processor 160. RX spatial processor 160 performs MIMO detection on the received symbols for traffic data with the channel estimates and provides data symbol estimates. An RX data processor 170 further processes (e.g., deinterleaves and decodes) the data symbol estimates and provides decoded data to a data sink 172.

Receiver station 150 may evaluate the channel conditions and send feedback information to transmitter station 110. The feedback information may indicate, e.g., the rank to use for transmission, channel quality indicators (CQIs), the packet format to use for transmission, acknowledgments (ACKS) and/or negative acknowledgments (NAKs) for packets decoded by receiver station 150, other types of information, or any combination thereof. The feedback information is processed (e.g., encoded, interleaved, and symbol mapped) by a TX signaling processor 180, spatially processed by a TX spatial processor 182, and further processed by transmitters 154a through 154r to generate R modulated signals, which are transmitted via antennas 152a through 152r.

At transmitter station 110, the R modulated signals are received by antennas 134a through 134t, processed by receivers 132a through 132t, spatially processed by an RX spatial processor 136, and further processed (e.g., deinterleaved and decoded) by an RX signaling processor 138 to recover the feedback information. Controller/processor 140 controls the data transmission to receiver station 150 based on the feedback information.

Controllers/processors 140 and 190 control the operation at stations 110 and 150, respectively. Memories 142 and 192 store data and program codes for stations 110 and 150, respectively.

The rank prediction techniques described herein may be used for any MIMO wireless communication system, e.g. MIMO wireless communication systems such as Frequency Division Multiple Access (FDMA) systems, Code Division Multiple Access (CDMA) systems, Time Division Multiple Access (TDMA) systems, Spatial Division Multiple Access (SDMA) systems, Orthogonal FDMA (OFDMA) systems, Single-Carrier FDMA (SC-FDMA) systems, and so on. An OFDMA system utilizes Orthogonal Frequency Division Multiplexing (OFDM), and an SC-FDMA system utilizes Single-Carrier Frequency Division Multiplexing (SC-FDM). OFDM and SC-FDM partition the system bandwidth into multiple (K) orthogonal subcarriers, which are also called tones, bins, and so on. Each subcarrier may be modulated with data. In general, modulation symbols are sent in the frequency domain with OFDM and in the time domain with SC-FDM.

The MIMO channel formed by the T antennas at transmitter station 110 and the R antennas at receiver station 150 may be characterized by an R x T MIMO channel response matrix H(k) for each subcarrier k, which may be expressed as:

$$\underline{H}(k) = \begin{bmatrix} h_{1,1}(k) & h_{1,2}(k) & \ldots & h_{1,T}(k) \\ h_{2,1}(k) & h_{2,2}(k) & \ldots & h_{2,T}(k) \\ \vdots & \vdots & \ddots & \vdots \\ h_{R,1}(k) & h_{R,2}(k) & \ldots & h_{R,T}(k) \end{bmatrix}, k = 1, \ldots, K, \quad \text{Eq (1)}$$

where entry $h_{i,j}(k)$, for i=1, . . . , R and j=1, . . . , T, is the coupling or complex gain between transmit antenna j and receive antenna i for subcarrier k.

The MIMO channel may be decomposed into S spatial channels, where S≤min {T, R}. The spatial channels may also be referred to as spatial layers, layers, independent channels, and so on. The MIMO channel response matrix H(k) may be diagonalized to obtain S eigenmodes of the MIMO channel, which may be viewed as orthogonal spatial channels. S data symbol streams may be sent on the S eigenmodes by performing eigen-beamforming at the transmitter. S data symbol streams may also be sent on the S spatial channels with some other spatial processing or without any spatial processing at the transmitter.

The number of eigenmodes (or the number of spatial channels) is referred to as the rank of the MIMO channel. The MIMO channel is considered full rank if S=min {T, R} and is less than full rank if S<min {T, R}. The rank is generally determined by channel conditions. For example, the rank is typically higher in wireless channels with rich scattering and is typically lower in spatially correlated channels and line-of-sight (LOS) channels.

Good performance (e.g., higher overall throughput) may be achieved by transmitting data such that the number of data symbol streams is matched to the rank of the MIMO channel. In a low-rank channel, reducing the number of data symbol streams may substantially reduce inter-stream interference and increase the received signal qualities of the transmitted data symbol streams, which may allow these streams to be sent at higher rates. Thus, it may be possible to achieve a higher overall throughput with fewer data symbol streams. Conversely, in a full-rank channel, the maximum number of data symbol streams may be sent to fully utilize all of the spatial channels of the MIMO channel and to maximize MIMO gains.

The rank prediction techniques described herein determine the number of data symbol streams to transmit such that good performance can be achieved.

The rank prediction techniques may be used with various operational modes such as a single codeword (SCW) mode and a multiple codeword (MCW) mode. In the SCW mode, a single packet format is used for all data symbol streams, which may simplify operation at the transmitter and receiver. In the MCW mode, a different packet format may be used for each data symbol stream, which may improve performance in some channel conditions.

The rank prediction techniques may also be used for various spatial processing schemes such as a direct mapping scheme, a pseudo-random mapping scheme, a beam-forming scheme, and so on. In the direct mapping scheme, one data symbol stream is sent from each transmit antenna without any spatial processing. In the pseudo-random mapping scheme, each data symbol stream is sent from all T transmit antennas, and all data symbol streams achieve similar received signal qualities. In the beam-forming scheme, each data symbol stream is sent on a different eigenmode, and the data symbol streams may achieve the same or different received signal qualities. In general, signal quality may be quantified by signal-to-noise ratio (SNR), signal-to-noise-and-interference ratio (SINR), energy-per-symbol-to-noise ratio (Es/No), and so on. For clarity, SNR is used to represent signal quality in the description below.

For clarity, the rank prediction techniques are described below for an OFDM-based system, e.g., an OFDMA system. Furthermore, the techniques are described for the SCW mode with the pseudo-random mapping scheme.

Figure 2:
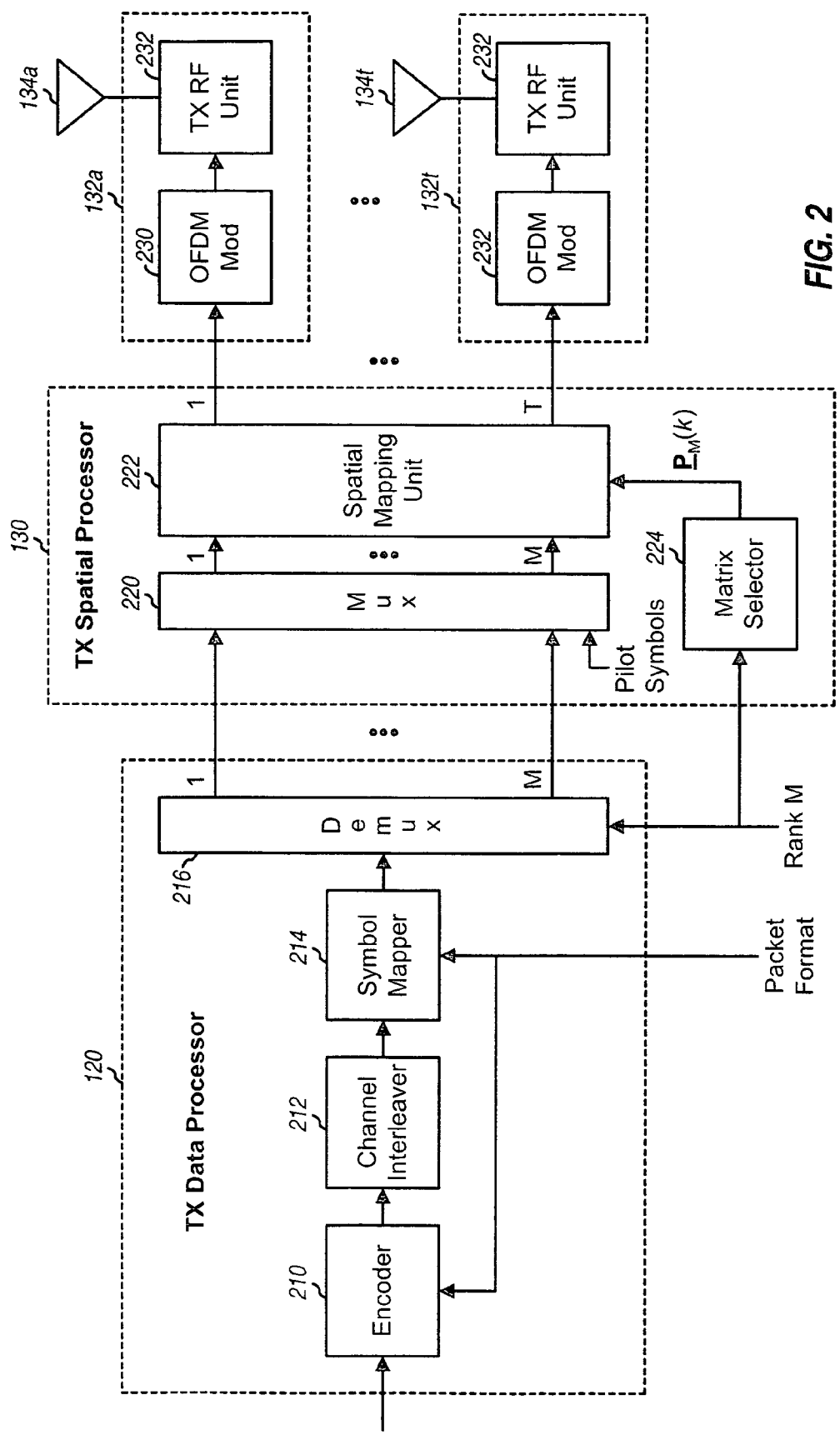
FIG. 2 shows processing units at the transmitter station.

FIG. 2 shows a block diagram of an embodiment of TX data processor 120, TX spatial processor 130, and transmitters 132a through 132t at transmitter station 110. Within TX data processor 120, an encoder 210 encodes traffic data in accordance with a coding scheme and generates code bits. The coding scheme may include a Turbo code, a convolutional code, a low density parity check (LDPC) code, a cyclic redundancy check (CRC) code, a block code, and so on, or a combination thereof. A channel interleaver 212 interleaves (or reorders) the code bits based on an interleaving scheme and provides interleaved bits. A symbol mapper 214 maps the interleaved bits in accordance with a modulation scheme and provides data symbols. A demultiplexer (Demux) 216 demultiplexes the data symbols into M streams, where M is the predicted/selected rank of the MIMO channel and is provided by controller/processor 140.

Within TX spatial processor 130, a multiplexer (Mux) 220 receives the M data symbol streams from TX data processor 120 and maps the data symbols and pilot symbols to the proper subcarriers in each symbol period. A spatial mapping unit 222 multiplies the data and/or pilot symbols for each subcarrier k with a T x M spatial mapping matrix $P_M(k)$ from a matrix selector 224 and provides output symbols for that subcarrier. Matrix $P_M(k)$ may be a sub-matrix of a T x T Fourier matrix, a T x T Hadamard matrix, a T x T orthonormal matrix, or some other matrix. Matrix selector 224 may determine the dimension of $P_M(k)$ based on the rank M from controller/processor 140. Matrix selector 224 may also provide different spatial mapping matrices for different subcarriers. Spatial mapping unit 222 provides T output symbol streams to T transmitters 132a through 132t.

Each transmitter 132 includes an OFDM modulator (Mod) 230 and a TX radio frequency (RF) unit 232. Within each transmitter 132, OFDM modulator 230 receives an output symbol stream and generates OFDM symbols. In each symbol period, OFDM modulator 230 performs a K-point IFFT on K output symbols for K subcarriers and appends a cyclic prefix to generate an OFDM symbol for that symbol period. TX RF unit 232 processes the OFDM symbols and generates a modulated signal.

At receiver station 150, the received symbols from receivers 154a through 154r may be expressed as:

$$r(k)=H(k)\cdot P_M(k)\cdot s(k)+n(k)=H_M(k)\cdot s(k)+n(k), \quad \text{Eq (2)}$$

where s(k) is an M x 1 vector of data symbols for subcarrier k,
r(k) is an R x 1 vector of received symbols for subcarrier k,
$H_M(k)=H(k)\cdot P_M(k)$ is an R x M effective MIMO channel response matrix for subcarrier k, and
n(k) is an R x 1 noise vector for subcarrier k.

For simplicity, the noise may be assumed to be additive white Gaussian noise (AWGN) with a zero mean vector and a covariance matrix of $n(k)=\sigma_n^2 \cdot I$, where $\sigma_n^2$ is the variance of the noise and I is the identity matrix.

Receiver station 150 may use various MIMO detection techniques to recover the data symbols sent by transmitter station 110. These MIMO detection techniques include (1) linear MIMO detection techniques such as minimum mean square error (MMSE), zero-forcing (ZF), and maximal ratio combining (MRC) techniques and (2) non-linear MIMO detection techniques such as maximum likelihood (ML) decoding, list sphere decoding (LSD), decision feedback equalizer (DFE), and successive interference cancellation (SIC) techniques. Receiver station 150 may derive a spatial filter matrix for each subcarrier k based on the MMSE, ZF or MRC technique, as follows:

$$M_{mmse}(k)=D_{mmse}(k)\cdot [H_M^H(k)\cdot H_M(k)+\sigma_n^2 \cdot I]^{-1}\cdot H_M^H(k), \quad \text{Eq (3)}$$

$$M_{zf}(k)=[H_M^H(k)\cdot H_M(k)]^{-1}\cdot H_M^H(k), \text{ and} \quad \text{Eq (4)}$$

$$M_{mrc}(k)=D_{mrc}(k)\cdot H_M^H(k), \quad \text{Eq (5)}$$

where $$Q_M(k)=[H_M^H(k)\cdot H_M(k)+\sigma_n^2 \cdot I]^{-1}\cdot H_M^H(k)\cdot H_M(k),$$

$$D_{mmse}(k)=[\text{diag}\{Q_M(k)\}]^{-1}, \text{ and}$$

$$D_{mrc}(k)=[\text{diag}\{H_M^H(k)\cdot H_M(k)\}]^{-1}. \quad \text{Eq (6)}$$

In equations (3) and (5), $D_{mmse}(k)$ and $D_{mrc}(k)$ are M x M diagonal matrices of scaling values used to obtain normalized estimates of the data symbols.

Receiver station 150 may perform MIMO detection as follows:

$$\hat{s}(k)=M(k)\cdot r(k)=s(k)+\tilde{n}(k), \quad \text{Eq (7)}$$

where M(k) is an M x R spatial filter matrix that may be $M_{mmse}(k)$, $M_{zf}(k)$ or $M_{mrc}(k)$,
ŝ(k) is an M x 1 vector with M data symbol estimates, and
ñ(k) is a vector of noise after the MIMO detection.

Receiver station 150 may obtain an estimate of H(k) or $H_M(k)$ based on pilot symbols received from transmitter station 110. Receiver station 150 may then derive M(k) based on H(k) or $H_M(k)$. The dimension of M(k) is dependent on the rank M used for transmission. The data symbol estimates in ŝ(k) are estimates of the data symbols in s(k).

In an embodiment, rank prediction is achieved by evaluating the performance of different possible ranks of the MIMO channel and selecting the rank with the best or near best performance. Performance may be quantified by various metrics such as channel capacity, throughput, signal quality (e.g., SNR), and so on. Channel capacity generally refers to the theoretical transmission capacity of a communication channel. The capacity of a MIMO channel is dependent on the number of spatial channels in the MIMO channel and the signal quality of each spatial channel. Throughput generally refers to the amount of data sent via a communication channel. Throughput is dependent on the channel capacity as well as system parameters, e.g., the packet formats available for use. Channel capacity and throughput may be given in terms of spectral efficiency, which is typically given in units of information bits per second per Hertz (bps/Hz). Channel capacity is referred to as simply capacity in the description below.

In an embodiment, the rank prediction accounts for system losses. As used herein, system losses refer to any type of loss that may be experienced by data transmission. System losses may include system implementation losses (e.g., due to coding scheme, packet format, etc.), losses due to channel variability (e.g., variability in interference and transmit power), processing losses (e.g., channel estimation errors), and/or other types of losses.

Figure 3:
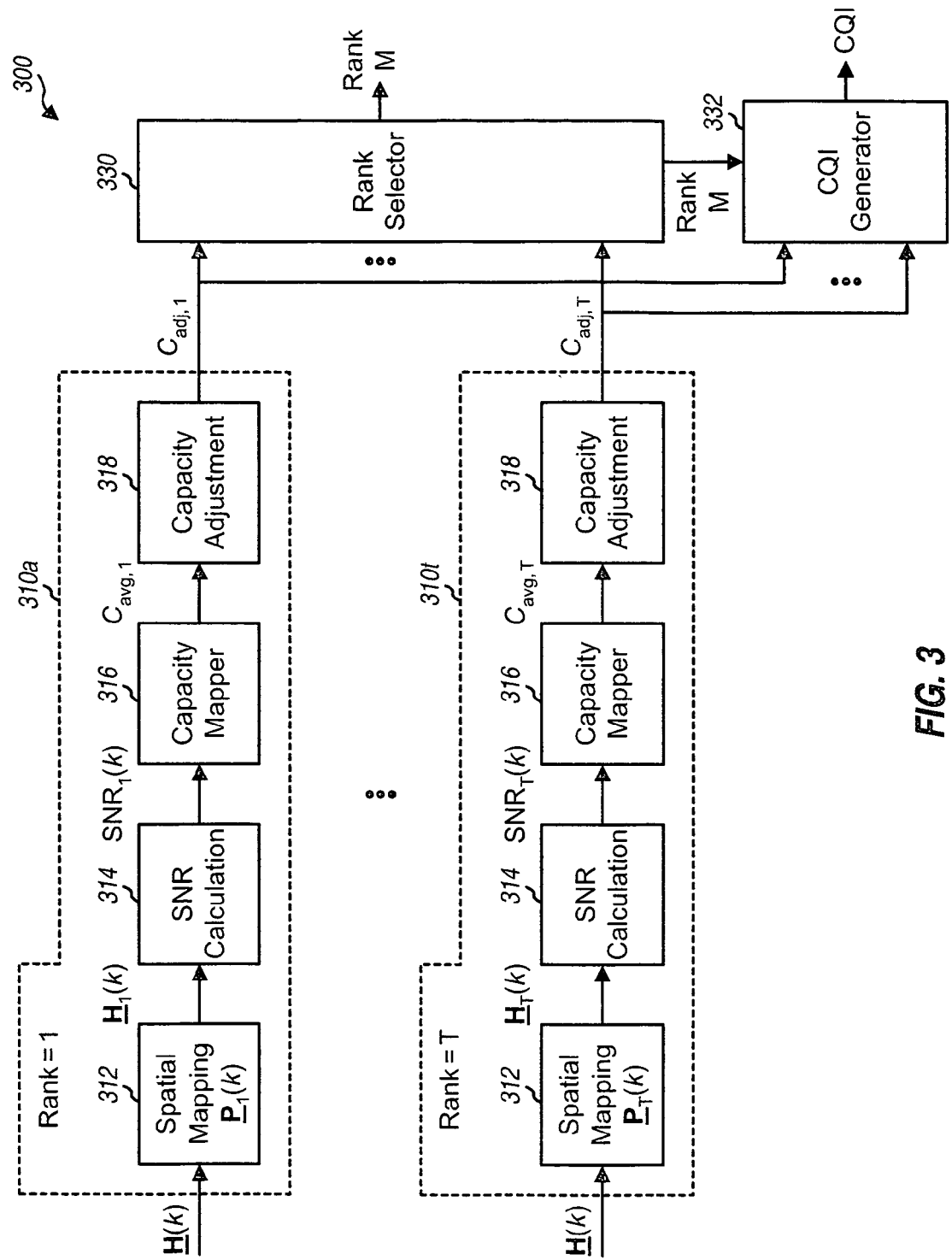
FIG. 3 shows a rank predictor that performs capacity-based rank prediction.

FIG. 3 shows an embodiment of a rank predictor 300 that performs capacity-based rank prediction and accounts for system losses. Rank predictor 300 evaluates the performance of each possible rank using capacity as the performance metric. For simplicity, the following description assumes that T≤R, and that up to T data symbol streams may be sent simultaneously from T transmit antennas. Rank predictor 300 includes T processing sections 310a through 310t for T possible ranks of m=1 through T, respectively. Each processing section 310 determines the average capacity for a different possible rank that may be used for data transmission.

Within processing section 310 for rank m, where m∈{1, ..., T}, a spatial mapping unit 312 receives the MIMO channel response matrix H(k) for each subcarrier k, multiplies H(k) with a T x m spatial mapping matrix $P_m(k)$ for rank m, and provides an R x m effective MIMO channel response matrix $H_m(k)$ for subcarrier k. Unit 312 performs spatial mapping in the same manner as spatial mapping unit 222 at transmitter station 110 assuming that m data symbol streams are transmitted for rank m.

An SNR calculation unit 314 determines the SNRs of the m data symbol streams or equivalently the m spatial channels for rank m. The SNRs are dependent on the MIMO detection technique used by receiver station 150 as well as the number of data symbol streams sent simultaneously. For the MMSE technique described above, $Q_m(k)$ is first determined based on $H_m(k)$ as shown in equation (6). The SNR of each data symbol stream for rank m may then be expressed as:

$$SNR_{m,i}(k) = \frac{q_{m,i}(k)}{1 - q_{m,i}(k)}, \text{ for } i = 1, \ldots, m, \quad \text{Eq (8)}$$

where $q_{m,i}(k)$ is the i-th diagonal element of $Q_m(k)$ for subcarrier k, and $SNR_{m,i}(k)$ is the SNR of data symbol stream i for subcarrier k.

Equation (8) gives SNR in linear unit. SNR is computed in different manners for other MIMO detection techniques.

The average SNR of all m data symbol streams for rank m may then be computed as follows:

$$SNR_{avg,m}(k) = \frac{1}{m} \cdot \sum_{i=1}^{m} SNR_{m,i}(k), \quad \text{Eq (9)}$$

where $SNR_{avg,m}(k)$ is the average SNR of all m data symbol streams for subcarrier k.

A capacity mapper 316 maps the average $SNR_{avg,m}(k)$ for each subcarrier k to capacity and further accumulates the capacities of all K subcarriers. The capacity mapping may be performed based on an unconstrained capacity function, as follows:

$$C_{avg,m} = \sum_{k=1}^{K} \log_2[1 + SNR_{avg,m}(k)], \quad \text{Eq (10)}$$

where $C_{avg,m}$ is the average capacity of each spatial channel for rank m. In equation (10), the capacity of each subcarrier is given as: $\log_2[1+SNR_{avg,m}(k)]$. The capacities for all K subcarriers are then accumulated to obtain the average capacity for rank m. The unconstrained capacity function assumes no loss from coding or modulation.

The capacity mapping may also be performed based on a constrained capacity function, as follows:

$$C_{avg,m} = \sum_{k=1}^{K} \log_2[1 + \eta \cdot SNR_{avg,m}(k)], \quad \text{Eq (11)}$$

where η<1.0 is a penalty factor that may account for various factors such as modulation scheme, coding scheme, code rate, packet size, and so on. Capacity may also be determined based on other capacity functions or look-up tables.

A capacity adjustment unit 318 adjusts the average capacity $C_{avg,m}$ to account for various factors, as described below. Unit 318 provides an adjusted capacity $C_{adj,m}$ for rank m.

A rank selector 330 receives the adjusted capacities $C_{adj,1}$ through $C_{adj,T}$ for all T possible ranks 1 through T. Rank selector 330 first determines the total capacity $C_{total,m}$ for each rank m, as follows:

$$C_{total,m} = m \cdot C_{avg,m}. \quad \text{Eq (12)}$$

Rank selector 330 then selects one of the T possible ranks. In an embodiment, rank selector 330 provides the rank with the largest total capacity, as follows:

$$M = \underset{m \in \{1, \ldots, T\}}{\operatorname{argmax}} (C_{total,m}). \quad \text{Eq (13)}$$

In another embodiment, rank selector 330 selects the lowest rank with a total capacity that is within a predetermined percentage of the largest total capacity, as follows:

$$M = \min \{\arg(C_{total,m} > \beta \cdot C_{max})\}, \quad \text{Eq (14)}$$

where $C_{max}$ is the largest total capacity for all T possible ranks and β≤1.0. A lower rank is generally more robust against deleterious channel conditions and channel estimation errors. Thus, if a lower rank can achieve a total capacity that is close to the largest total capacity, then the lower rank may be selected for use.

A CQI generator 332 receives the adjusted capacities $C_{adj,1}$ through $C_{adj,T}$ for all T possible ranks as well as the selected rank M. In an embodiment, CQI generator 332 determines an effective SNR for the adjusted capacity $C_{adj,M}$ of the selected rank M, as follows:

$$SNR_{eff,M} = 10 \log_{10}(2^{C_{adj,M}} - 1), \qquad \text{Eq (15)}$$

where $SNR_{eff,M}$ is given in units of decibel (dB). CQI generator 332 may also determine the effective SNR based on some other function or a look-up table of SNR versus capacity.

In an embodiment, CQI generator 332 quantizes the effective SNR to a predetermined number of bits to obtain a CQI for the selected rank M. In another embodiment, CQI generator 332 maps the effective SNR to a packet format based on a rate look-up table of packet format versus required SNR. This rate look-up table contains a required SNR for each packet format supported by the system. The required SNR for each packet format may be the minimum SNR needed to reliably transmit packets in an AWGN channel with a certain target packet error rate (PER), e.g., 1% PER. The rate look-up table may be generated by computer simulation, empirical measurement, testing, and/or some other mechanism.

Figure 4:
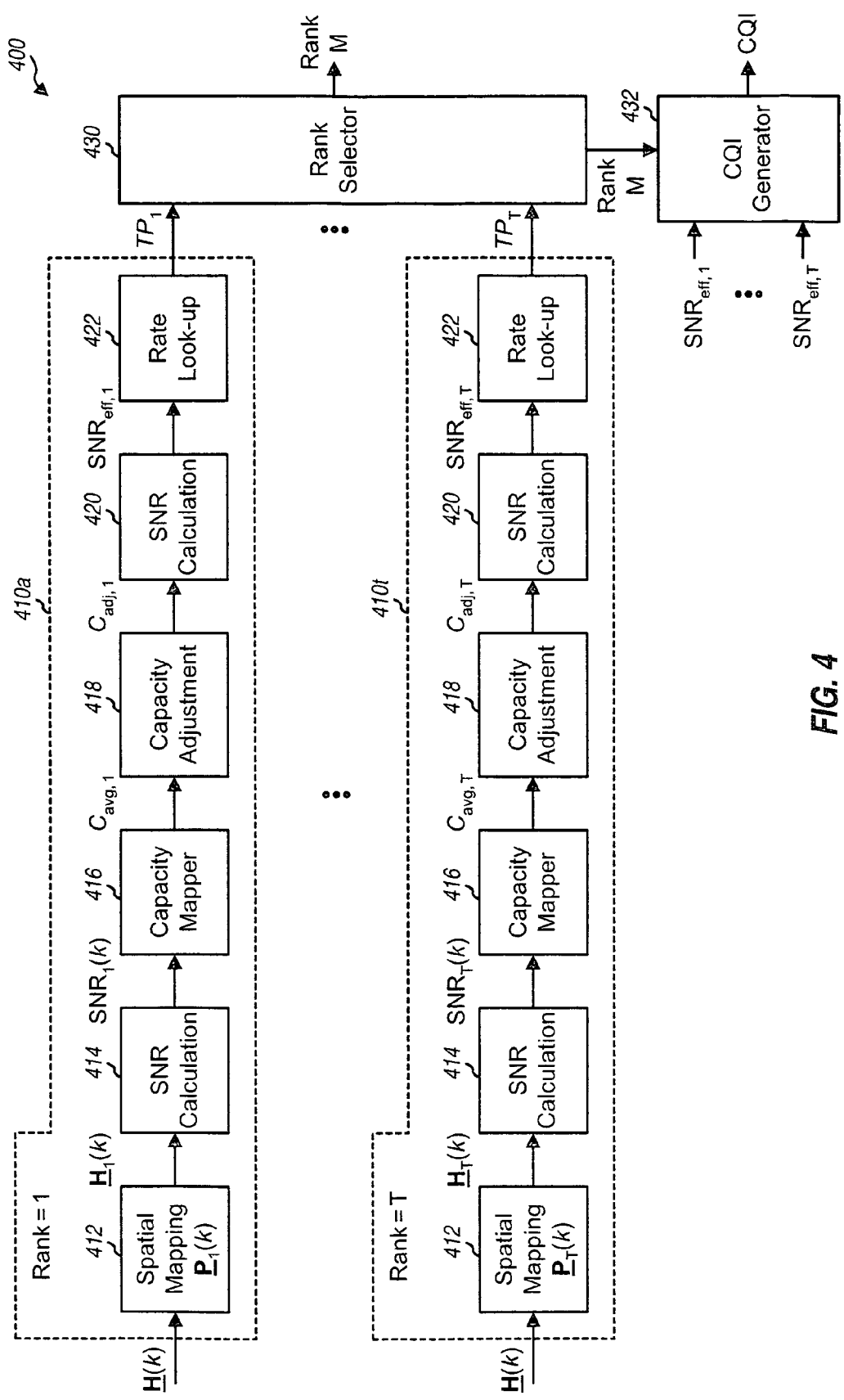
FIG. 4 shows a rank predictor that performs throughput-based rank prediction.

FIG. 4 shows an embodiment of a rank predictor 400 that performs throughput-based rank prediction and accounts for system losses. Rank predictor 400 evaluates the performance of each possible rank using throughput as the performance metric. Rank predictor 400 includes T processing sections 410a through 410t for T possible ranks of m=1 through T, respectively. Each processing section 410 determines the throughput for a different possible rank that may be used for data transmission.

Within processing section 410 for rank m, where $m \in \{ \ldots, T\}$, units 412, 414, 416, and 418 operate in the same manner as units 312, 314, 316, and 318, respectively, in FIG. 3. An SNR calculation unit 420 receives the adjusted capacity $C_{adj,m}$ for rank m and determines the effective SNR, e.g., as shown in equation (15). A rate look-up table 422 receives the effective SNR for rank m and provides the packet format with the largest throughput and a required SNR that is less than the effective SNR.

A rank selector 430 receives the throughputs $TP_1$ through $TP_T$ for all T possible ranks and determines the total throughput $TP_{total,m}$ for each rank, as follows:

$$TP_{total,m} = m \cdot TP_m. \qquad \text{Eq (16)}$$

Rank selector 430 then selects one of the T possible ranks. In an embodiment, rank selector 430 provides the rank with the largest total throughput, as follows:

$$M = \underset{m \in \{1, \ldots, T\}}{\operatorname{argmax}} (TP_{total,m}). \qquad \text{Eq (17)}$$

In another embodiment, rank selector 430 selects the lowest rank with a total throughput that is within a predetermined percentage of the largest total throughput, as follows:

$$M = \min \{\arg(TP_{total,m} > \beta \cdot TP_{max})\}. \qquad \text{Eq (18)}$$

where $TP_{max}$ is the largest total throughput for all T possible ranks.

A CQI generator 432 may receive the effective SNRs for all T possible ranks and provide the effective SNR for the selected rank M as the CQI, as shown in FIG. 4. CQI generator 432 may also receive the packet formats for all T possible ranks and provide the packet format for the selected rank M as the CQI (not shown in FIG. 4).

FIGS. 3 and 4 show two embodiments of rank prediction based on performance metrics of capacity and throughput, respectively. Throughput may be considered as a quantized version of capacity, where the quantization is determined by the supported packet formats. The difference between capacity and throughput generally decreases with more supported packet formats.

Rank prediction may also be performed based on other performance metrics.

In another embodiment, rank prediction is performed based on a performance metric of signal quality, e.g., SNR. The average SNR of each subcarrier k for rank m may be determined, e.g., as shown in equation (9), and accumulated over the K subcarriers to obtain the average SNR for rank m. Adjustments may then be applied to the average SNR for each rank m to obtain an adjusted SNR for that rank. The adjusted SNRs for the T possible ranks may then be used to select one rank as well as to determine the CQI for the selected rank.

The average capacity $C_{avg,m}$ in FIGS. 3 and 4 is indicative of the capacity of each spatial channel in the MIMO channel with rank m. The computed average capacity $C_{avg,m}$ is subject to various sources of error such as, e.g., channel estimation errors. The average capacity $C_{avg,m}$ may also not be achievable due to various reasons such as, e.g., a finite set of packet formats supported by the system and usable for data transmission. Furthermore, the capacity computed at one time instant may be different than the capacity at another time instant when data is sent, e.g., due to changes in channel conditions, variations in interference and transmit power, and so on. In addition, certain constraints may be imposed in the selection of rank. The average capacity $C_{avg,m}$ may be adjusted to account for these various factors.

Figure 5:
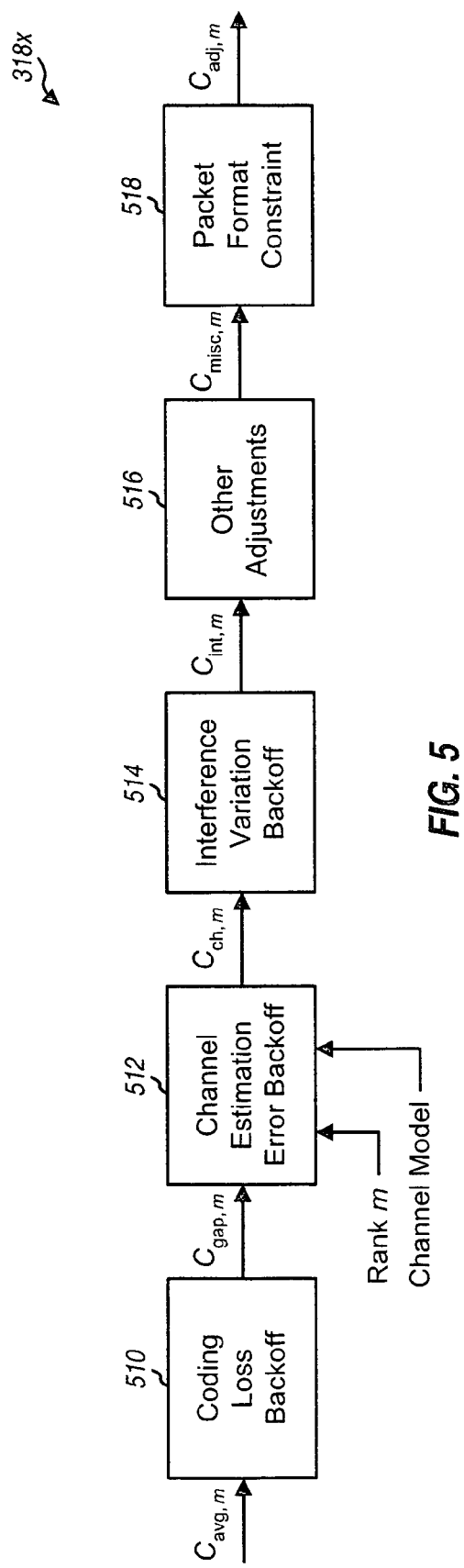
FIG. 5 shows a capacity adjustment unit within a rank predictor.

FIG. 5 shows an embodiment of a capacity adjustment unit 318x, which may be used for each capacity adjustment unit 318 in FIG. 3 and each capacity adjustment unit 418 in FIG. 4. Within capacity adjustment unit 318x, a unit 510 adjusts the average capacity for rank m to account for coding loss. Different error correction codes may have different amounts of losses, which may be determined by the error correction capabilities of these codes. For example, a convolutional code may have a larger loss than a Turbo code. An adjustment for coding loss, which is also referred to as a gap-to-capacity backoff. In an aspect, it may be computed as follows:

$$SNR_{avg,m} = 2^{C_{avg,m}} - 1, \qquad \text{Eq (19)}$$

$$C_{gap,m} = \log_2[1 + SNR_{avg,m}/g], \qquad \text{Eq (20)}$$

where $g \geq 1.0$ is a factor that accounts for coding loss. Different codes may be associated with different values of g.

A unit 512 adjusts the capacity for rank m to account for channel estimation errors. In an aspect, this may be as follows:

$$SNR_{gap,m} = 2^{C_{gap,m}} - 1, \qquad \text{Eq (21)}$$

$$SNR_{ch,m} = \text{Channel\_Backoff}(SNR_{gap,m}, m, \text{Channel model}), \qquad \text{Eq (22)}$$

$$C_{ch,m} = \log_2[1 + SNR_{ch,m}], \qquad \text{Eq (23)}$$

where Channel_Backoff is a function that reduces the SNR of rank m to account for channel estimation errors.

The amount of loss due to channel estimation errors may be dependent on various factors such as the rank of the MIMO channel (e.g., more loss for higher rank), the channel model (e.g., more loss for high mobility), and so on. The channel model may be quantified by antenna configuration, mobility or Doppler, and/or other factors. The amount of loss due to channel estimation errors may be determined based on computer simulation, empirical measurement, testing, and/or some other means. The loss may also be determined for different operating scenarios such as different antenna configurations (e.g., 2x4, 4x2), different candidate ranks, different Doppler, and so on. In general, the Channel_Backoff function may be defined for any number of operation scenarios and based on any number of input parameters as well as any type of input parameters. The Channel_Backoff function may be stored in one or more look-up tables, e.g., one look-up table for each operating scenario.

A unit 514 adjusts the capacity for rank m to account for interference variations. In an aspect, this may be as follows:

$$SNR_{ch,m} = 2^{C_{ch,m}} - 1, \quad \text{Eq (24)}$$

$$SNR_{int,m} = \text{Interference\_Backoff}(SNR_{ch,m})\text{Interference variation}), \quad \text{Eq (25)}$$

$$C_{int,m} = \log_2[1 + SNR_{int,m}], \quad \text{Eq (26)}$$

where Interference_Backoff is a function that reduces the SNR of rank m to account for variations in interference observed by receiver station 150.

Receiver station 150 may measure interference over time and/or frequency and determine the variation in interference based on these measurements. The amount of loss due to interference variation may be determined based on computer simulation, empirical measurement, testing, and/or some other means. The Interference_Backoff function may be stored in a look-up table.

A unit 516 may apply other adjustments to the capacity for rank m. In an embodiment, unit 516 may apply an adjustment to account for (1) variation in transmit power over time due to power control and/or (2) an offset between transmit power of pilot or control channel and transmit power of traffic channel. For example, unit 516 may either reduce or increase capacity depending on whether the transmit power is reduced or increased in an upcoming interval. In an embodiment, unit 516 may disqualify rank m, if m>1 and the SNR of rank m is below a predetermined SNR. A low SNR may indicate that station 110 or 150 is located near coverage edge and is a candidate for handoff. Disqualifying rank m may result in selection of a lower rank (e.g., rank 1), which may be more robust for low SNR conditions. In an embodiment, unit 516 may adjust the capacity for rank m to account for H-ARQ packet termination latency. With H-ARQ, a packet is sent in one transmission and, if needed, one or more retransmissions until the packet is decoded correctly by receiver station 150. H-ARQ packet termination latency refers to the average number of transmission/retransmissions for packets. More latency may indicate inaccuracy in the rank prediction. Hence, more backoff may be applied for more latency. In an embodiment, unit 516 may apply a bias such that a lower rank is selected if variability in rank is observed. In general, unit 516 may apply adjustments for any number of factors and any type of factor that may affect data transmission performance.

A unit 518 limits the capacity for rank m to within a range of minimum and maximum values. The minimum value is called the floor, is denoted as $C_{floor}$, and may be set to the lowest throughput of all supported packet formats. The maximum value is called the ceiling, is denoted $C_{ceiling}$, and may be set to the largest throughput of all supported packet formats. The capacity for each rank m may then be constrained to be within the floor and ceiling. In an aspect, this may be as follows:

$$C_{adj,m} = \begin{cases} 0 & \text{if} & C_{misc,m} < C_{floor} \\ C_{ceiling} & \text{if} & C_{misc,m} > C_{ceiling} \\ C_{misc,m} & \text{if} & C_{floor} \leq C_{misc,m} \leq C_{ceiling} \end{cases} \quad \text{Eq (27)}$$

where $C_{misc,m}$ is the capacity for rank m from unit 516. In equation (27), the capacity for rank m is not modified if it is within the range of the floor and ceiling, is set to the ceiling if it is larger than the ceiling, and is set to zero if it is less than the floor. Setting the capacity to zero means that rank m will not be selected for use.

In general, adjustments may be applied for any number and any type of factors. FIG. 5 shows adjustments being applied for some exemplary factors. Adjustments utilized may also be applied for fewer, different, and/or additional factors. For example, the adjustment for the supported packet formats in equation (27) may be omitted. As another example, adjustments may be applied for only channel estimation errors and interference variation. The adjustments provide margins in the rank prediction so that an appropriate rank may be selected for use in light of the various possible sources of error in rank prediction.

For clarity, with the exception of unit 516, FIG. 5 shows a separate unit being used to apply an adjustment for each factor. However, the units may be integrated into one or more functional units, e.g. software, hardware, or combinations thereof. Also for clarity, the adjustment for each factor is described separately. In general, the adjustments may be applied individually for each factor, for a subset of factors, or for all factors being considered. Furthermore, the adjustments may be applied in other orders than the order shown in FIG. 5. The adjustments may be applied using any number of functions and/or look-up tables with any number of input parameters and any type of input parameter.

In the embodiments shown in FIGS. 3 through 5, adjustments are applied to the average capacity of the spatial channels for each rank m. Rank selectors 330 and 430 then determine the total capacity or total throughput for each rank and select the rank with the best or near best performance. Applying adjustments to the average capacity may result in more granularity for higher ranks. Adjustments may also be applied to total capacity or total throughput instead of average capacity or average throughput.

Receiver station 150 may quantize the selected rank M to a predetermined number of bits, which may be determined based on the highest rank supported by the system. For example, if the system supports a 4x4 configuration as the highest dimensionality configuration, then the highest possible rank is four, and the selected rank M may be conveyed using two bits.

Receiver station 150 may also quantize the CQI to a predetermined number of bits, which may be determined by the desired accuracy for the CQI. More bits allow the CQI to be reported with finer granularity, which may be beneficial for packet format selection. The number of bits for the CQI may be selected based on (e.g., proportional to) the number of packet formats supported by the system. More packet formats generally imply smaller steps in spectral efficiency between packet formats. More accurate CQI may then be beneficial in selecting a suitable packet format. The CQI may be quantized to three, four, five, six or some other number of bits.

Receiver station 150 may determine and report the rank and CQI periodically and at a sufficiently fast rate to achieve good performance for data transmission. The rank and CQI may be determined and reported at the same rate, e.g., every 5, 10 or 20 milliseconds (ms). Alternatively, the rank and CQI may be determined and reported at different rates. For example, the rank may be determined and reported at a first rate, and the CQI may be determined and reported at a second rate. The rank of a MIMO channel may change at a slower rate than the SNR of the spatial channels and may thus be reported at a slower rate than the CQI.

The rank and CQI may be determined by receiver station 150 and sent back to transmitter station 110, as shown in FIG. 1. The rank and CQI may also be determined by transmitter station 110 using information from receiver station 150. For example, in a time division duplexed (TDD) system, the downlink and uplink share the same frequency channel, and the channel response for one link may be assumed to be reciprocal of the channel response for the other link. In this case, transmitter station 110 may be able to estimate the MIMO channel response based on a pilot sent by receiver station 150. Transmitter station 110 may then determine the rank and the packet format to use for data transmission based on its estimate of the MIMO channel response.

For clarity, the rank prediction techniques have been described for the SCW mode. The techniques may also be used to select the rank for the MCW mode. The rank prediction for the MCW mode may be performed as described above for the SCW mode. For each candidate rank m, adjustments may be applied to the capacity of each spatial channel or the total capacity of all spatial channels for rank m. A CQI may be determined for each spatial channel in the selected rank M. More than one CQI may be generated if M is greater than one.

FIG. 6 shows an embodiment of a process 600 for performing rank prediction. Performance metrics for a plurality of ranks are determined (block 612). Each rank is indicative of a different number of data symbol streams to send simultaneously via a MIMO channel or, equivalently, the number of spatial channels to use for data transmission. The performance metrics may relate to the capacity of the MIMO channel, the throughput of data transmission sent via the MIMO channel, signal quality of the MIMO channel, and so on. A performance metric may be determined for each of the ranks.

Adjustments are applied to the performance metrics for the plurality of ranks to obtain adjusted performance metrics for these ranks (block 614). The adjustments account for some system loss parameters. The losses, may be, one or more of losses due to an error correction code used for data transmission, channel estimation errors at the receiver, variation in interference observed by the receiver, variability in transmit power due to power control, and/or other factors. In addition, other loss parameters may be utilized. The adjustments may be applied to SNR (as described above), capacity, throughput, and/or other measures, all of which may be related. For example, SNR may be converted to capacity, and vice versa, via a capacity function or a look-up table. Ranks with performance metrics below a predetermined threshold may be omitted from consideration. The performance metrics for the ranks may be limited to within a range of values, which may be determined by the supported packet formats. The adjustments may be applied using look-up tables, calculations, and/or some other means.

A rank to use for data transmission is selected from among the plurality of ranks based on the adjusted performance metrics (block 616). The rank with the best adjusted performance metric may be selected. Alternatively, the lowest rank with an adjusted performance metric that is within a predetermined percentage of the best adjusted performance metric may be selected. At least one CQI is determined for the selected rank based on an adjusted performance metric for the selected rank (block 618). For example, one CQI may be determined for the SCW mode whereas M CQIs may be determined for the MCW mode. Each CQI may be a quantized SNR, a packet format, or some other type of information. If the rank prediction is performed at the receiver, then the selected rank and the CQI(s) may be quantized and sent to the transmitter.

Process 600 may be performed by controller/processor 190 or some other processor at receiver station 150. Process 600 may also be performed by controller/processor 140 or some other processor at transmitter station 110. The adjustments may be performed using look-up tables stored in memory 192 at receiver station 150 or memory 142 at transmitter station 110.

FIG. 7 shows an embodiment of an apparatus 700 for performing rank prediction. Apparatus 700 includes means for determining performance metrics for a plurality of ranks (block 712), means for applying adjustments to the performance metrics for the plurality of ranks to obtain adjusted performance metrics for these ranks (block 714), means for selecting a rank to use for data transmission from among the plurality of ranks based on the adjusted performance metrics (block 716), and means for determining at least one CQI for the selected rank based on an adjusted performance metric for the selected rank (block 718).

The rank prediction techniques described herein may be implemented by various means. For example, these techniques may be implemented in hardware, firmware, software, or a combination thereof. For a hardware implementation, the processing units used to perform rank prediction may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the rank prediction techniques may be implemented with instructions (e.g., procedures, functions, and so on) that may be utilized to perform the functions described herein. The instructions, e.g. as software or firmware, may be stored in a memory (e.g., memory 192 in FIG. 1) and executed by a processor (e.g., processor 190). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
    at least one processor configured to determine performance metrics for a plurality of ranks, each rank indicative of a different number of data streams to send simultaneously via a multiple-input multiple-output (MIMO) channel,
    to apply adjustments to the performance metrics for the plurality of ranks to obtain adjusted performance metrics, the adjustments accounting for system losses, and to select a rank to use for data transmission from among the plurality of ranks based on the adjusted performance metrics; and a memory coupled to the at least one processor.

2. The apparatus of claim 1, wherein the performance metrics relate to capacity of the MIMO channel.

3. The apparatus of claim 1, wherein the performance metrics relate to throughput of data transmission sent via the MIMO channel.

4. The apparatus of claim 1, wherein the performance metrics relate to signal quality of the MIMO channel.

5. The apparatus of claim 1, wherein the adjustments account for losses due to an error correction code used for data transmission.

6. The apparatus of claim 1, wherein the adjustments account for channel estimation errors at a receiver.

7. The apparatus of claim 1, wherein the adjustments account for variation in interference observed by a receiver.

8. The apparatus of claim 1, wherein the adjustments account for variation in transmit power used for data transmission.

9. The apparatus of claim 1, wherein the at least one processor is configured to omit ranks having performance metrics below a predetermined threshold.

10. The apparatus of claim 1, wherein the at least one processor is configured to limit the performance metrics for the plurality of ranks to within a range of values.

11. The apparatus of claim 10, wherein the range of values is determined by packet formats usable for data transmission.

12. The apparatus of claim 1, wherein the at least one processor is configured to select a rank with best adjusted performance metric.

13. The apparatus of claim 1, wherein the at least one processor is configured to determine best adjusted performance metric among the adjusted performance metrics for the plurality of ranks, and to select a lowest rank with an adjusted performance metric that is within a predetermined percentage of the best adjusted performance metric.

14. The apparatus of claim 1, wherein the at least one processor is configured to represent the selected rank with a predetermined number of bits, and to send the selected rank to a transmitter.

15. The apparatus of claim 1, wherein the at least one processor is configured to determine at least one channel quality indicator (CQI) based on an adjusted performance metric for the selected rank.

16. The apparatus of claim 1, wherein the at least one processor is configured to determine a signal-to-noise ratio (SNR) based on an adjusted performance metric for the selected rank, and to quantize the SNR to obtain a channel quality indicator (CQI) for the selected rank.

17. The apparatus of claim 1, wherein the memory is configured to store at least one look-up table of adjustments for the performance metrics.

18. A method comprising:

determining performance metrics for a plurality of ranks, each rank indicative of a different number of data streams to send simultaneously via a multiple-input multiple-output (MIMO) channel;

applying adjustments to the performance metrics for the plurality of ranks to obtain adjusted performance metrics, the adjustments accounting for system losses;

selecting a rank to use for data transmission from among the plurality of ranks based on the adjusted performance metrics;

transmitting data in accordance with the selected rank.

19. The method of claim 18, wherein determining performance metrics comprise determining performance metrics for one or more of capacity of the MIMO channel, throughput of data transmission sent via the MIMO channel, or signal quality of the MIMO channel.

20. The method of claim 18, further comprising calculating adjustments for one or more of the performance metrics.

21. The method of claim 20, wherein calculating comprises calculating to account for losses due to one or more of an error correction code used for data transmission, channel estimation errors at a receiver, variation in interference observed by the receiver, variation in transmit power used for data transmission, or a combination thereof.

22. An apparatus comprising:

means for determining performance metrics for a plurality of ranks, each rank indicative of a different number of data streams to send simultaneously via a multiple-input multiple-output (MIMO) channel;

means for applying adjustments to the performance metrics for the plurality of ranks to obtain adjusted performance metrics, the adjustments accounting for system losses; and means for selecting a rank to use for data transmission from among the plurality of ranks based on the adjusted performance metrics.

23. The apparatus of claim 22, wherein the means for determining performance metrics comprise means for determining performance metrics for one or more of capacity of the MIMO channel, throughput of data transmission sent via the MIMO channel, or signal quality of the MIMO channel.

24. The apparatus of claim 22, further comprising means for calculating adjustments for one or more of the performance metrics.

25. The apparatus of claim 24, wherein the means for calculating comprises means for calculating to account for losses due to one or more of an error correction code used for data transmission, channel estimation errors at a receiver, variation in interference observed by the receiver, variation in transmit power used for data transmission, or a combination thereof.

26. A non-transitory processor readable media for storing instructions, the instructions comprising:

instructions for determining performance metrics for a plurality of ranks, each rank indicative of a different number of data streams to send simultaneously via a multiple-input multiple-output (MIMO) channel;

instructions for applying adjustments to the performance metrics for the plurality of ranks to obtain adjusted performance metrics, the adjustments accounting for system losses; and instructions for selecting a rank to use for data transmission from among the plurality of ranks based on the adjusted performance metrics.

* * * * *